(12) United States Patent
Nanba

(10) Patent No.: US 9,243,080 B2
(45) Date of Patent: Jan. 26, 2016

(54) PRODUCTION METHOD FOR POLYTETRAFLUOROETHYLENE AQUEOUS DISPERSION

(71) Applicant: DAIKIN INDUSTRIES, LTD., Osaka-shi, Osaka (JP)

(72) Inventor: Yoshinori Nanba, Settsu (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 0 days.

(21) Appl. No.: 14/648,373

(22) PCT Filed: Dec. 2, 2013

(86) PCT No.: PCT/JP2013/082386
§ 371 (c)(1),
(2) Date: May 29, 2015

(87) PCT Pub. No.: WO2014/084400
PCT Pub. Date: Jun. 5, 2014

(65) Prior Publication Data
US 2015/0299342 A1   Oct. 22, 2015

Related U.S. Application Data

(60) Provisional application No. 61/731,905, filed on Nov. 30, 2012.

(51) Int. Cl.
*C08F 14/26* (2006.01)
*C08F 2/26* (2006.01)
*C08F 2/44* (2006.01)
*C08F 2/10* (2006.01)
*C08L 27/18* (2006.01)

(52) U.S. Cl.
CPC . *C08F 2/10* (2013.01); *C08L 27/18* (2013.01); *C08L 2201/54* (2013.01)

(58) Field of Classification Search
CPC ........ C08F 2/10; C08L 27/18; C08L 2201/54
USPC ............................ 524/805, 461; 526/201, 206
See application file for complete search history.

(56) References Cited

U.S. PATENT DOCUMENTS

| 2,559,752 | A | 7/1951 | Berry |
| 6,395,848 | B1 | 5/2002 | Morgan et al. |
| 6,509,429 | B1 | 1/2003 | Kitaichi et al. |
| 2008/0200571 | A1 | 8/2008 | Higuchi et al. |
| 2008/0200627 | A1 | 8/2008 | Funaki et al. |
| 2010/0160465 | A1 | 6/2010 | Aten et al. |
| 2010/0160490 | A1 | 6/2010 | Leffew et al. |
| 2010/0204345 | A1* | 8/2010 | Yamanaka ................ C08F 2/18 514/772.4 |
| 2011/0015342 | A1 | 1/2011 | Kose et al. |
| 2012/0028046 | A1* | 2/2012 | Ono .......................... C08F 2/26 428/402 |
| 2014/0031469 | A1 | 1/2014 | Tanimoto et al. |

FOREIGN PATENT DOCUMENTS

| JP | 2003-500495 A | 1/2003 |
| JP | 2009-155558 A | 7/2009 |
| JP | 2010-180364 A | 8/2010 |
| JP | 4714991 B2 | 7/2011 |
| JP | 2012-513530 A | 6/2012 |
| JP | 2012-513535 A | 6/2012 |
| JP | 2012-214766 A | 11/2012 |
| WO | 2007/046345 A1 | 4/2007 |
| WO | 2007/046377 A1 | 4/2007 |
| WO | 2008/001894 A1 | 1/2008 |
| WO | 2009/020187 A1 | 2/2009 |
| WO | 2009/119202 A1 | 10/2009 |
| WO | 2010/113950 A1 | 10/2010 |
| WO | 2013/115278 A1 | 8/2013 |

OTHER PUBLICATIONS

Machine Translation of JP 2010-180364 of record May 29, 2015.

\* cited by examiner

*Primary Examiner* — Kelechi Egwim
(74) *Attorney, Agent, or Firm* — Sughrue Mion, PLLC

(57) ABSTRACT

The present invention aims to provide a method of producing a PTFE aqueous dispersion which contains PTFE particles having a small particle size and which is excellent in dispersion stability by multistage polymerization without using a long-chain fluorosurfactant. The method includes the steps of: (1) polymerizing a fluoromonomer in an aqueous medium in the presence of a fluorosurfactant and a polymerization initiator to provide an aqueous dispersion containing particles of at least one fluoropolymer selected from the group consisting of PTFE and melt-processable fluororesins excluding polytetrafluoroethylene; and (2) polymerizing TFE alone or TFE and a modifying monomer in an aqueous medium in the presence of the fluoropolymer particles and a polymerization initiator to provide an aqueous dispersion containing PTFE particles. The fluoropolymer particles have an equivalent weight (EW) of 6,000 or more and a volume average particle size of not smaller than 0.1 nm but smaller than 20 nm.

5 Claims, No Drawings

PRODUCTION METHOD FOR POLYTETRAFLUOROETHYLENE AQUEOUS DISPERSION

CROSS REFERENCE TO RELATED APPLICATIONS

This application is a National Stage of International Application No. PCT/JP2013/082386 filed Dec. 2, 2013, claiming priority based on U.S. Provisional Patent Application No. 61/731,905, filed Nov. 30, 2012, the contents of all of which are incorporated herein by reference in their entirety.

TECHNICAL FIELD

The present invention relates to a method of producing a polytetrafluoroethylene aqueous dispersion.

BACKGROUND ART

Fluororesin aqueous dispersions are usually produced by emulsion polymerizing a fluoromonomer in the presence of a fluorosurfactant. Conventional fluorosurfactants are long-chain fluorosurfactants such as perfluorooctanoic acid or its salt (for example, see Patent Literature 1).

However, Patent Literature 2 discloses that the persons and parties involved have proposed to control disposal of ammonium perfluorooctanoate, which does not exist in the natural world and is difficult to decompose, in consideration of the environment, and they also have indicated that the substance is highly bioaccumulative.

Thus, Patent Literature 2 discloses a polytetrafluoroethylene aqueous emulsion obtained by emulsion polymerizing tetrafluoroethylene alone or with a monomer copolymerizable therewith in an aqueous medium using a fluorinated emulsifier represented by the formula (1): $XCF_2CF_2(O)_mCF_2CF_2OCF_2COOA$ (wherein X represents a hydrogen atom or a fluorine atom; A represents a hydrogen atom, an alkali metal, or $NH_4$; and m is an integer of 0 or 1) in an amount of 1500 to 20000 ppm based on the final yield of polytetrafluoroethylene.

For example, Patent Literature 3 discloses a method of producing a low molecular weight polytetrafluoroethylene, comprising emulsion polymerizing tetrafluoroethylene alone or tetrafluoroethylene and a modifying monomer copolymerizable with the tetrafluoroethylene in an aqueous medium in the presence of a reactive compound and a chain-transfer agent, wherein the reactive compound has a hydrophilic group and a functional group that is reactive in radical polymerization, and the amount of the reactive compound is more than the amount corresponding to 10 ppm based on the amount of the aqueous medium.

Further, Patent Literature 4 discloses a method of producing an aqueous dispersion of fluoropolymer particles, comprising the steps of: preparing dispersed particles of a fluorinated ionomer in an aqueous polymerization medium; and polymerizing at least one fluorinated monomer in the presence of the dispersed particles of the fluorinated ionomer and an initiator in the aqueous polymerization medium to form an aqueous dispersion of fluoropolymer particles.

CITATION LIST

Patent Literature

Patent Literature 1: U.S. Pat. No. 2,559,752 A
Patent Literature 2: WO 2007/046345
Patent Literature 3: JP 2010-180364 A
Patent Literature 4: JP 2012-513530 T

SUMMARY OF INVENTION

Technical Problem

In the conventional techniques, polymerization of a fluoromonomer using a fluorosurfactant which is not a long-chain fluorosurfactant tends to provide fluororesin particles having a large particle size. Further, such particles tend to have poor dispersion stability, resulting in problems such as sticking of the polymer to an agitator during the polymerization. In particular, multistage polymerization has difficulty in providing a polytetrafluoroethylene aqueous dispersion having a sufficiently small particle size and excellent dispersion stability.

The present invention is devised in the aforementioned situation, and aims to provide a method of producing a polytetrafluoroethylene aqueous dispersion in which the polytetrafluoroethylene particles have a small particle size and which is excellent in dispersion stability by multistage polymerization without using a long-chain fluorosurfactant.

Solution to Problem

The present inventor has performed various studies on a method of producing a polytetrafluoroethylene aqueous dispersion comprising the steps of: (1) polymerizing a fluoromonomer in an aqueous medium in the presence of a fluorosurfactant and a polymerization initiator to provide an aqueous dispersion containing a particles of at least one fluoropolymer selected from the group consisting of polytetrafluoroethylene and melt-processible fluororesins excluding polytetrafluoroethylene; and (2) further polymerizing tetrafluoroethylene alone or tetrafluoroethylene and a modifying monomer in an aqueous medium in the presence of the fluoropolymer particles and a polymerization initiator to provide an aqueous dispersion containing polytetrafluoroethylene particles. Then, the inventor has found that a large amount of a fluorosurfactant in step (1) can provide an aqueous dispersion which contains fluoropolymer particles having a significantly small volume average particle size without a conventionally used long-chain fluorosurfactant, and as a result, the step (2) can provide an aqueous dispersion which contains polytetrafluoroethylene particles having a significantly small particle size and which is excellent in dispersion stability. Finally, the inventor has arrived at the present invention.

Specifically, the present invention relates to a method of producing a polytetrafluoroethylene aqueous dispersion, comprising the steps of: (1) polymerizing a fluoromonomer in an aqueous medium in the presence of a fluorosurfactant and a polymerization initiator to provide an aqueous dispersion containing particles of at least one fluoropolymer selected from the group consisting of polytetrafluoroethylene and melt-processible fluororesins excluding polytetrafluoroethylene; and (2) polymerizing tetrafluoroethylene alone or tetrafluoroethylene and a modifying monomer in an aqueous medium in the presence of the fluoropolymer particles and a polymerization initiator to provide an aqueous dispersion containing polytetrafluoroethylene particles, the fluoropolymer particles having an equivalent weight (EW) of not less than 6,000 and a volume average particle size of not smaller than 0.1 nm but smaller than 20 nm.

The fluorosurfactant is preferably a fluorinated compound represented by the following formula (1):

$$X-(CF_2)_{m1}-Y \quad (1)$$

wherein X represents H or F; m1 is an integer of 3 to 5; and Y represents —SO$_3$M, —SO$_4$M, —SO$_3$R, —SO$_4$R, —COOM, —PO$_3$M$_2$, or —PO$_4$M$_2$, where M represents H, NH$_4$, or an alkali metal, and R represents a C1-C12 alkyl group.

The polymerization reactions in the steps (1) and (2) are preferably performed in the absence of a fluorinated compound represented by the following formula (2):

$$X\text{—}(CF_2)_{m2}\text{—}Y \qquad (2)$$

wherein X represents H or F; m2 is an integer of 6 or greater; and Y represents —SO$_3$M, —SO$_4$M, —SO$_3$R, —SO$_4$R, —COOM, —PO$_3$M$_2$, or —PO$_4$M$_2$, where M represents H, NH$_4$, or an alkali metal, and R represents a C1-C12 alkyl group.

The fluorosurfactant preferably has a Log POW value of not higher than 3.4.

The polytetrafluoroethylene particles preferably have an average primary particle size of 100 to 500 nm.

Advantageous Effects of Invention

The method of producing a polytetrafluoroethylene aqueous dispersion of the present invention can provide an aqueous dispersion which contains polytetrafluoroethylene particles having a significantly small particle size and which is excellent in dispersion stability by multistage polymerization without using a long-chain fluorosurfactant.

DESCRIPTION OF EMBODIMENTS

Before the specific description of the present invention, the terms used herein are defined or described below.

The term "fluororesin" herein means a partially crystalline fluoropolymer, and is not fluororubber but fluoroplastic. The fluororesin has a melting point and is a thermoplastic material. It may be melt-processible or non-melt-processible.

The term "melt-processible" herein means that a polymer can be molten and then processed using a conventional processing device such as an extruder or an injection molding device. Thus, a melt-processible fluororesin usually has a melt flow rate of 0.01 to 500 g/10 min, which is measured by the method to be mentioned later.

The term "perfluororesin" herein means a resin comprising a perfluoropolymer in which all the monovalent atoms coupled with the carbon atoms constituting the main chain of the polymer are fluorine atoms. Here, the carbon atoms constituting the main chain of the polymer may be coupled with not only the monovalent atoms (fluorine atoms) but also groups such as alkyl groups, fluoroalkyl groups, alkoxy groups, and fluoroalkoxy groups. Some fluorine atoms coupled with the carbon atoms constituting the main chain of the polymer may be replaced by chlorine atoms. Polymer end groups, in other words, groups terminating the polymer chain, may comprise an atom other than fluorine. Most polymer end groups are derived from a polymerization initiator or a chain-transfer agent used for the polymerization reaction.

The term "fluororubber" herein means an amorphous fluoropolymer. The term "amorphous" herein means that the fluoropolymer has a melting peak (ΔH) of 4.5 J/g or lower determined by differential scanning calorimetry (DSC) (temperature increasing rate: 10° C./min) or differential thermal analysis (DTA) (temperature-increasing rate: 10° C./min). When it is crosslinked, the fluororubber shows elastomeric characteristics. The term "elastomeric characteristics" herein means that the polymer can be stretched and, when released from the force for stretching the polymer, the polymer can return to the original length and maintain this original length.

The term "perfluoromonomer" herein means a monomer having no carbon-hydrogen bond in a molecule. The perfluoromonomer may be a monomer which consists of carbon atoms and fluorine atoms; a monomer in which some of the fluorine atoms coupled with the carbon atoms are replaced by chlorine atoms; or a monomer having not only carbon atoms but also a nitrogen atom, an oxygen atom, and a sulfur atom. The perfluoromonomer is preferably a monomer in which all the hydrogen atoms are replaced by fluorine atoms. The perfluoromonomer does not include monomers that give a crosslinking site.

The term "monomer that gives a crosslinking site" herein means a monomer (cure-site monomer) having a crosslinkable group that can give a fluoropolymer a crosslinking site for forming a crosslink by a curing agent.

The term "polytetrafluoroethylene (PTFE)" herein preferably means a fluoropolymer including 99 mol % or more of tetrafluoroethylene based on the amounts of all the polymer units.

The term "fluororesin (excluding polytetrafluoroethylene)" and the term "fluororubber" herein each preferably mean a fluoropolymer including less than 99 mol % of tetrafluoroethylene based on the amounts of all the polymer units.

The "amounts of the respective monomers constituting a fluoropolymer" herein can be calculated by appropriate combination of NMR, FT-IR, elemental analysis, and X-ray fluorescence analysis in accordance with the types of the monomers.

The present invention is described in detail below.

The method of producing a polytetrafluoroethylene (PTFE) aqueous dispersion of the present invention comprises the steps of: (1) producing an aqueous dispersion containing fluoropolymer particles; and (2) producing an aqueous dispersion containing PTFE particles. The production method of the present invention is characterized in that a large amount of a specific fluorosurfactant is used to produce an aqueous dispersion containing fluoropolymer particles having a volume average particle size of not smaller than 0.1 nm but smaller than 20 nm in step (1), and that the fluoropolymer particles having a significantly limited volume average particle size is used for further polymerization of a fluoromonomer. Such features enable production of an aqueous dispersion which contains PTFE particles having a significantly small particle size and which is excellent in dispersion stability.

In step (1), a fluoromonomer is polymerized in an aqueous medium in the presence of a fluorosurfactant and a polymerization initiator to provide an aqueous dispersion containing particles of at least one fluoropolymer selected from the group consisting of PTFE and melt-processible fluororesins excluding PTFE.

The amount of the fluorosurfactant used in step (1) preferably corresponds to 2000 to 500000 ppm of the aqueous medium. Too small an amount of the fluorosurfactant fails to give an aqueous dispersion containing fluoropolymer particles having a small particle size. Too large an amount thereof fails to exert its effects that correspond to the amount, which is economically disadvantageous. The amount of the fluorosurfactant is more preferably 4600 ppm or more, still more preferably 18,000 ppm or more, even more preferably 20,000 ppm or more, particularly preferably 23,000 ppm or more, and most preferably 40,000 ppm or more, whereas the amount is more preferably 400,000 ppm or less, and still more preferably 300,000 ppm or less.

The fluoropolymer particles have a volume average particle size of not smaller than 0.1 nm but smaller than 20 nm. Use of fluoropolymer particles having a volume average particle size within the above range in step (2) can provide an aqueous dispersion which contains PTFE particles having a significantly small particle size and which is excellent in dispersion stability. With fluoropolymer particles having too large a volume average particle size, the step (2) fails to provide an aqueous dispersion which contains PTFE particles having a significantly small particle size and which is excellent in dispersion stability. Fluoropolymer particles having a volume average particle size of smaller than 0.1 nm are not easy to produce. The volume average particle size of the fluoropolymer particles is preferably not smaller than 0.5 nm, and more preferably not smaller than 1.0 nm, whereas the particle size is preferably not greater than 15 nm, more preferably not greater than 10 nm, and particularly preferably not greater than 5 nm.

In step (1), the volume average particle size is determined by dynamic light scattering. In the determination, a fluoropolymer aqueous dispersion with a fluoropolymer solids content of 1.0% by mass is prepared. The value is determined from 70 measurement processes using ELSZ-1000S (Otsuka Electronics Co., Ltd.) at 25° C. The refractive index of the solvent (water) is 1.3328 and the viscosity of the solvent (water) is 0.8878 mPa·s. The volume average particle size is the average particle size of the particles dispersed in the state of primary particles.

The fluorosurfactant preferably has a Log POW value of not higher than 3.4. The Log POW value is a 1-octanol/water partition coefficient which is represented by Log P (wherein P is the ratio between the concentration of the fluorosurfactant in octanol and that in water in a phase-separated octanol/water (1:1) liquid mixture containing the fluorosurfactant). The Log POW value is preferably 1.5 or higher. In order to make it easy to remove the surfactant from PTFE, the value is more preferably 3.0 or lower, and still more preferably 2.8 or lower.

The Log POW value is determined as follows. Specifically, HPLC is performed on standard substances (heptanoic acid, octanoic acid, nonanoic acid, and decanoic acid) each having a known octanol/water partition coefficient using TOSOH ODS-120T (φ4.6 mm×250 mm, TOSOH CORP.) as a column and acetonitrile/0.6% by mass $HClO_4$ aqueous solution (=1/1 (vol/vol %)) as an eluent, at a flow rate of 1.0 ml/min, a sample amount of 300 μL, and a column temperature of 40° C.; with a detection light of UV 210 nm. For each standard substance, a calibration curve is drawn with respect to the elution time and the known octanol/water partition coefficient. Based on this calibration curve, the Log POW value is calculated from the elution time of the sample liquid in HPLC.

The fluorosurfactant having a Log POW value of not higher than 3.4 is preferably an anionic fluorosurfactant, and examples thereof include those described in US 2007/0015864, US 2007/0015865, US 2007/0015866, US 2007/0276103, US 2007/0117914, US 2007/142541, US 2008/0015319, U.S. Pat. No. 3,250,808, U.S. Pat. No. 3,271,341, JP 2003-119204 A, WO 2005/042593, WO 2008/060461, WO 2007/046377, WO 2007/119526, WO 2007/046482, and WO 2007/046345.

The fluorosurfactant having a Log POW value of not higher than 3.4 is preferably an anion surfactant.

The anion surfactant is preferably a carboxylic acid surfactant or a sulfonic acid surfactant, for example. Examples of the surfactants include those comprising perfluorocarboxylic acids (I) represented by the following formula (I), ω-H perfluorocarboxylic acids (II) represented by the following formula (II), perfluoropolyether carboxylic acids (III) represented by the following formula (III), perfluoroalkyl alkylene carboxylic acids (IV) represented by the following formula (IV), perfluoroalkoxy fluorocarboxylic acids (V) represented by the following formula (V), perfluoroalkyl sulfonic acids (VI) represented by the following formula (VI), and/or perfluoroalkyl alkylene sulfonic acids (VII) represented by the following formula (VII).

The perfluorocarboxylic acid (I) is represented by the following formula (I):

$$F(CF_2)_{n1}COOM \quad (I)$$

wherein n1 is an integer of 3 to 6; and M represents H, $NH_4$, or an alkali metal element.

In the formula (I), the lower limit of n1 is preferably 4 in order to achieve good stability of the polymerization reaction. M is preferably $NH_4$ because it is less likely to remain during processing of the resulting PTFE aqueous dispersion.

For example, the perfluorocarboxylic acid (I) is preferably $F(CF_2)_6COOM$, $F(CF_2)_5COOM$, or $F(CF_2)_4COOM$, where M is defined as mentioned above.

The ω-H perfluorocarboxylic acid (II) is represented by the following formula (II):

$$H(CF_2)_{n2}COOM \quad (II)$$

wherein n2 is an integer of 4 to 8; and M is defined as mentioned above.

In the formula (II), the upper limit of n2 is preferably 6 in order to achieve good stability in the polymerization reaction. M is preferably $NH_4$ because it is less likely to remain during processing of the resulting PTFE aqueous dispersion.

For example, the ω-H perfluorocarboxylic acid (II) is preferably $H(CF_2)_8COOM$, $H(CF_2)_7COOM$, $H(CF_2)_6COOM$, $H(CF_2)_5COOM$, or $H(CF_2)_4COOM$, where M is defined as mentioned above.

The perfluoropolyether carboxylic acid (III) is represented by the following formula (III):

$$Rf^1\text{-}O\text{---}(CF(CF_3)CF_2O)_{n3}CF(CF_3)COOM \quad (III)$$

wherein $Rf^1$ represents a C1-C5 perfluoroalkyl group; n3 is an integer of 0 to 3; and M is defined as mentioned above.

In the formula (III), $Rf^1$ is preferably a C4 or lower perfluoroalkyl group and n3 is preferably 0 or 1 in order to achieve good stability in the polymerization, and M is preferably $NH_4$ because it is less likely to remain during processing of the resulting PTFE aqueous dispersion.

For example, the perfluoropolyether carboxylic acid (III) is preferably $C_4F_9OCF(CF_3)COOM$, $C_3F_7OCF(CF_3)COOM$, $C_2F_5OCF(CF_3)COOM$, $CF_3OCF(CF_3)COOM$, or $CF_3OCF(CF_3)CF_2OCF(CF_3)COOM$, where M is defined as mentioned above. In order to achieve good stability in the polymerization and good removing efficiency, it is more preferably $CF_3OCF(CF_3)COOM$ or $CF_3OCF(CF_3)CF_2OCF(CF_3)COOM$, where M is defined as mentioned above.

The perfluoroalkyl alkylene carboxylic acid (IV) is represented by the following formula (IV):

$$Rf^2(CH_2)_{n4}Rf^3COOM \quad (IV)$$

wherein $Rf^2$ represents a C1-C5 perfluoroalkyl group; $Rf^3$ represents a C1-C3 linear or branched perfluoroalkylene group; n4 is an integer of 1 to 3; and M is defined as mentioned above.

In the formula (IV), $Rf^2$ is preferably a C2 or higher perfluoroalkyl group or a C4 or lower perfluoroalkyl group. $Rf^3$ is preferably a C1 or C2 perfluoroalkylene group, and more preferably —$(CF_2)$— or —$CF(CF_3)$—. Further, n4 is preferably 1 or 2, and more preferably 1. M is preferably $NH_4$ because it is less likely to remain during processing of the resulting PTFE aqueous dispersion.

For example, the perfluoroalkyl alkylene carboxylic acid (IV) is preferably $C_4F_9CH_2CF_2COOM$, $C_3F_7CH_2CF_2COOM$, $C_2F_5CH_2CF_2COOM$, $C_4F_9CH_2CF(CF_3)COOM$, $C_3F_7CH_2CF(CF_3)COOM$, $C_2F_5CH_2CF(CF_3)COOM$, $C_4F_9CH_2CH_2CF_2COOM$, $C_3F_7CH_2CH_2CF_2COOM$, or $C_2F_5CH_2CH_2CF_2COOM$, where M is defined as mentioned above.

The perfluoroalkoxy fluorocarboxylic acid (V) is represented by the following formula (V):

$$Rf^4-O-CY^1Y^2CF_2-COOM \qquad (V)$$

wherein $Rf^4$ represents a C1-C5 perfluoroalkyl group; $Y^1$ and $Y^2$ may be the same as or different from each other, and represent H or F; and M is defined as mentioned above.

In the formula (V), $Rf^4$ is preferably a C1-C3 perfluoroalkyl group, and more preferably a C3 perfluoroalkyl group in order to achieve good polymerization stability. M is preferably $NH_4$ because it is less likely to remain during processing of the resulting PTFE aqueous dispersion.

For example, the perfluoroalkoxy fluorocarboxylic acid (V) is preferably $C_3F_7OCH_2CF_2COOM$, $C_3F_7OCHFCF_2COOM$, or $C_3F_7OCF_2CF_2COOM$, where M is defined as mentioned above.

The perfluoroalkyl sulfonic acid (VI) is represented by the following formula (VI):

$$F(CF_2)_{n5}SO_3M \qquad (VI)$$

wherein n5 is an integer of 3 to 6; and M is defined as mentioned above.

In the formula (VI), n5 is preferably an integer of 4 or 5 in order to achieve good polymerization stability, and M is preferably $NH_4$ because it is less likely to remain during processing of the resulting PTFE aqueous dispersion.

For example, the perfluoroalkyl sulfonic acid (VI) is preferably $F(CF_2)_4SO_3M$ or $F(CF_2)_5SO_3M$, where M is defined as mentioned above.

The perfluoroalkyl alkylene sulfonic acid (VII) is represented by the following formula (VII):

$$Rf^5(CH_2)_{n6}SO_3M \qquad (VII)$$

wherein $Rf^5$ represents a 1 to 5 perfluoroalkyl group; n6 is an integer of 1 to 3; and M is defined as mentioned above.

In the formula (VII), $Rf^5$ is preferably a C1-C3 perfluoroalkyl group, and more preferably a C3 perfluoroalkyl group. Further, n6 is preferably 1 or 2, and more preferably 1. M is preferably $NH_4$ because it is less likely to remain during processing of the resulting PTFE aqueous dispersion.

For example, the perfluoroalkyl alkylene sulfonic acid (VII) is preferably $C_3F_7CH_2SO_3M$ wherein M is defined as mentioned above.

The fluorosurfactant having a Log POW value of not higher than 3.4 is preferably at least one selected from the group consisting of:
the fluorinated compounds represented by the following formula (1):

$$X-(CF_2)_{m1}-Y \qquad (1)$$

wherein X represents H or F; m1 is an integer of 3 to 5; and Y represents $-SO_3M$, $-SO_4M$, $-SO_3R$, $-SO_4R$, $-COOM$, $-PO_3M_2$, or $-PO_4M_2$, where M represents H, $NH_4$, or an alkali metal, and R represents a C1-C12 alkyl group;
the ω-H perfluorocarboxylic acids (II) represented by the formula (II);
the perfluoropolyether carboxylic acids (III) represented by the formula (III);
the perfluoroalkyl alkylene carboxylic acids (IV) represented by the formula (IV);
the perfluoroalkoxy fluorocarboxylic acids (V) represented by the formula (V); and
the perfluoroalkyl alkylene sulfonic acid (VII) represented by the formula (VII).

The fluorosurfactant having a Log POW value of not higher than 3.4 is more preferably at least one selected from the group consisting of:
the fluorinated compounds represented by the following formula (1):

$$X-(CF_2)_{m1}-Y \qquad (1)$$

wherein X represents H or F; m1 is an integer of 3 to 5; and Y represents $-SO_3M$, $-SO_4M$, $-SO_3R$, $-SO_4R$, $-COOM$, $-PO_3M_2$, or $-PO_4M_2$, where M represents H, $NH_4$, or an alkali metal, and R represents a C1-C12 alkyl group;
the fluorinated compounds represented by the following formula (3):

$$CF_3OCF(CF_3)CF_2OCF(CF_3)COOX \qquad (3)$$

wherein X represents a hydrogen atom, $NH_4$, or an alkali metal atom; and
the fluorinated compounds represented by the following formula (4):

$$CF_3CF_2OCF_2CF_2OCF_2COOX \qquad (4)$$

wherein X represents a hydrogen atom, $NH_4$, or an alkali metal atom.

The fluorosurfactant having a Log POW value of not higher than 3.4 is still more preferably a fluorinated compound represented by the following formula (1):

$$X-(CF_2)_{m1}-Y \qquad (1)$$

wherein X represents H or F; m1 is an integer of 3 to 5; and Y represents $-SO_3M$, $-SO_4M$, $-SO_3R$, $-SO_4R$, $-COOM$, $-PO_3M_2$, or $-PO_4M_2$, where M represents H, $NH_4$, or an alkali metal, and R represents a C1-C12 alkyl group.

The polymerization of a fluoromonomer in step (1) provides an aqueous dispersion containing particles of at least one fluoropolymer selected from the group consisting of PTFE and melt-processible fluororesins excluding PTFE.

Examples of the fluoromonomer include fluoroolefins, preferably C2-C10 fluoroolefins; cyclic fluorinated monomers; fluorinated alkyl vinyl ethers represented by the formula $CQ_2=CQOR^1$ or $CQ_2=CQOR^2OR^3$ (wherein Q represents H or F; $R^1$ and $R^3$ represent a C1-C8 alkyl group in which part or all of the hydrogen atoms is/are replaced by fluorine atoms; and $R^2$ is a C1-C8 alkylene group in which part or all of the hydrogen atoms is/are replaced by fluorine atoms); fluoroolefins having a nitrile group; and fluorovinyl ethers having a nitrile group.

More specifically, the fluoromonomer is preferably at least one selected from the group consisting of tetrafluoroethylene (TFE), hexafluoropropylene (HFP), chlorotrifluoroethylene (CTFE), vinyl fluoride, vinylidene fluoride (VDF), trifluoroethylene, hexafluoroisobutylene, monomers represented by the formula $CH_2=CZ^1(CF_2)_nZ^2$ (wherein $Z^1$ represents H or F; $Z^2$ represents H, F, or Cl; and n is an integer of 1 to 10), perfluoro(alkyl vinyl ethers) (PAVE) represented by the formula $CF_2=CF-ORf^6$ (wherein Re represents a C1-C8 perfluoroalkyl group), alkyl perfluorovinyl ether derivatives represented by the formula $CF_2=CF-O-CH_2-Rf^7$ (wherein $Rf^7$ represents a C1-C5 perfluoroalkyl group), perfluoro-2,2-dimethyl-1,3-dioxole (PDD), and perfluoro-2-methylene-4-methyl-1,3-dioxolane (PMD).

Examples of the monomers represented by the formula $CH_2=CZ^1(CF_2)_nZ^2$ include $CH_2=CFCF_3$, $CH_2=CH-C_4F_9$, $CH_2=CH-C_6F_{13}$, and $CH_2=CF-C_3F_6H$.

Examples of the perfluoro(alkyl vinyl ethers) represented by the formula $CF_2=CF-ORf^6$ include $CF_2=CF-OCF_3$, $CF_2=CF-OCF_2CF_3$, and $CF_2=CF-OCF_2CF_2CF_3$.

The fluoromonomer may be polymerized together with a fluorine-free monomer. Examples of the fluorine-free monomer include hydrocarbon monomers reactive with the fluoromonomer. Examples of the hydrocarbon monomers include alkenes such as ethylene, propylene, butylene, and isobutylene; alkyl vinyl ethers such as ethyl vinyl ether, propyl vinyl ether, butyl vinyl ether, isobutyl vinyl ether, and cyclohexyl vinyl ether; vinyl esters such as vinyl acetate, vinyl propionate, n-vinyl butyrate, vinyl isobutyrate, vinyl valerate, vinyl pivalate, vinyl caproate, vinyl caprylate, vinyl caprate, vinyl versatate, vinyl laurate, vinyl myristate, vinyl palmitate, vinyl stearate, vinyl benzoate, vinyl para-t-butylbenzoate, vinyl cyclohexanecarboxylate, vinyl monochloroacetate, vinyl adipate, vinyl acrylate, vinyl methacrylate, vinyl crotonate, vinyl sorbate, vinyl cinnamate, vinyl undecylenate, vinyl hydroxyacetate, vinyl hydroxypropionate, vinyl hydroxybutyrate, vinyl hydroxyvalerate, vinyl hydroxyisobutyrate; and vinyl hydroxycyclohexanecarboxylate; alkyl allyl ethers such as ethyl allyl ether, propyl allyl ether, butyl allyl ether, isobutyl allyl ether, and cyclohexyl allyl ether; and alkyl allyl esters such as ethyl allyl ester, propyl allyl ester, butyl allyl ester, isobutyl allyl ester, and cyclohexyl allyl ester.

The fluorine-free monomer may be a functional group-containing hydrocarbon monomer. Examples of the functional group-containing hydrocarbon monomer include hydroxyalkyl vinyl ethers such as hydroxyethyl vinyl ether, hydroxypropyl vinyl ether, hydroxybutyl vinyl ether, hydroxyisobutyl vinyl ether, and hydroxycyclohexyl vinyl ether; glycidyl group-containing fluorine-free monomers such as glycidyl vinyl ether and glycidyl allyl ether; amino group-containing fluorine-free monomers such as amino alkyl vinyl ethers and amino alkyl allyl ethers; amide group-containing fluorine-free monomers such as (meth)acrylamide and methylol acrylamide; bromine-containing olefins, iodine-containing olefins, bromine-containing vinyl ethers, and iodine-containing vinyl ethers; and nitrile group-containing fluorine-free monomers.

The PTFE may be a PTFE homopolymer or a modified PTFE. The modified PTFE includes a TFE unit and a modifying monomer unit based on a modifying monomer copolymerizable with TFE. The PTFE may be a non-melt-processible, fibrillatable high molecular weight PTFE or a melt-processible, non-fibrillatable low molecular weight PTFE.

The modifying monomer may be any monomer copolymerizable with TFE. Examples thereof include perfluoroolefins such as hexafluoropropylene (HFP); chlorofluoroolefins such as chlorotrifluoroethylene (CTFE); hydrogen-containing fluoroolefins such as trifluoroethylene and vinylidene fluoride (VDF); perfluorovinyl ethers; perfluoroalkylethylenes; ethylene; and nitrile group-containing fluorinated vinyl ethers. These modifying monomers may be used alone or in combination.

Any perfluorovinyl ether may be used, and examples thereof include unsaturated perfluoro compounds represented by the following formula (5):

$$CF_2=CF-ORf^8 \quad (5)$$

wherein $Rf^8$ represents a perfluoro organic group. The term "perfluoro organic group" herein means an organic group in which all the hydrogen atoms coupled with the carbon atoms are replaced by fluorine atoms. The perfluoro organic group may have ether oxygen.

Examples of the perfluorovinyl ethers include perfluoro (alkyl vinyl ethers) (PAVE) represented by the formula (5) wherein $Rf^8$ is a C1-C10 perfluoroalkyl group. The perfluoroalkyl group preferably has 1 to 5 carbon atoms.

The perfluoroalkyl group in the PAVE may be a perfluoromethyl group, a perfluoroethyl group, a perfluoropropyl group, a perfluorobutyl group, a perfluoropentyl group, or a perfluorohexyl group, for example. Preferred is perfluoropropyl vinyl ether (PPVE) in which the perfluoroalkyl group is a perfluoropropyl group.

Examples of the perfluorovinyl ethers further include those represented by the formula (5) wherein $Rf^8$ is a C4-C9 perfluoro(alkoxy alkyl) group; those represented by the formula (5) wherein $Rf^8$ is a group represented by the following formula:

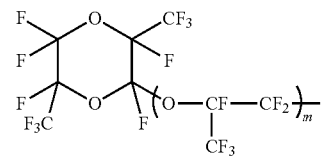

wherein m is 0 or an integer of 1 to 4; and those represented by the formula (5) wherein $Rf^8$ is a group represented by the following formula:

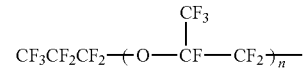

wherein n is an integer of 1 to 4.

Any perfluoroalkylethylenes may be used, and examples thereof include perfluorobutylethylene (PFBE) and perfluorohexylethylene (PFHE).

The nitrile group-containing fluorinated vinyl ether is more preferably a fluorinated vinyl ether represented by the formula $CF_2=CFORf^9CN$ wherein $Rf^9$ represents a C2-C7 alkylene group in which an oxygen atom may optionally be inserted between two carbon atoms.

The modifying monomer in the modified PTFE is preferably at least one selected from the group consisting of HFP, CTFE, VDF, PPVE, PFBE, and ethylene. It is more preferably at least one monomer selected from the group consisting of HFP and CTFE.

The modified PTFE preferably includes 0.001 to 2 mol %, and more preferably not less than 0.001 but less than 1 mol %, of the modifying monomer unit.

The amounts of the respective monomers constituting the PTFE herein can be calculated by appropriate combination of NMR, FT-IR, elemental analysis, and X-ray fluorescence analysis in accordance with the types of the monomers.

The PTFE produced in step (1) preferably has a melt viscosity (MV) of not lower than $1.0 \times 10$ Pa·S, more preferably not lower than $1.0 \times 10^2$ Pa·S, and still more preferably not lower than $1.0 \times 10^3$ Pa·S. Too low a melt viscosity may cause voids when the PTFE produced in step (2) is heated and fired, resulting in defects of the PTFE molded product.

The melt viscosity can be determined as follows. Specifically, 2 g of a sample is preliminarily heated for five minutes at a measurement temperature (380° C.), and then the value is measured at the maintained temperature with a load of 0.7 MPa using a flow tester (Shimadzu Corp.) and a 2φ-8 L die in conformity with ASTM D1238.

The PTFE produced in step (1) preferably has a melting point of 324° C. to 360° C.

The melting point herein is a temperature corresponding to the local maximum on a heat-of-fusion curve drawn using a differential scanning calorimeter (DSC) at a temperature-increasing rate of 10° C./min.

The melt-processible fluororesin is preferably at least one fluororesin selected from the group consisting of TFE/PAVE copolymers (PFA), TFE/HFP copolymers (FEP), ethylene (Et)/TFE copolymers (ETFE), Et/TFE/HFP copolymers, polychlorotrifluoroethylene (PCTFE), CTFE/TFE copolymers, Et/CTFE copolymers, and PVF. It is more preferably at least one perfluororesin selected from the group consisting of PFA and FEP.

Any PFA can be used, and it is preferably a copolymer including a TFE unit and a PAVE unit at a TFE/PAVE mole ratio of not lower than 70/30 but lower than 99/1. The mole ratio is more preferably not lower than 70/30 but not higher than 98.9/1.1, and still more preferably not lower than 80/20 but not higher than 98.9/1.1. Too small an amount of the TFE unit tends to cause deteriorated mechanical properties, whereas too large an amount thereof tends to cause so high a melting point that the moldability may deteriorate. The PFA is also preferably a copolymer including 0.1 to 10 mol % of a monomer unit derived from a monomer copolymerizable with TFE and PAVE and 90 to 99.9 mol % of the TFE unit and the HFP unit. Examples of the monomer copolymerizable with TFE and PAVE include HFP, vinyl monomers represented by the formula $CZ^3Z^4=CZ^5(CF_2)-Z^6$ (wherein $Z^3$, $Z^4$, and $Z^5$ may be the same as or different from each other, and represent a hydrogen atom or a fluorine atom; $Z^6$ represents a hydrogen atom, a fluorine atom, or a chlorine atom; and n is an integer of 2 to 10), and alkyl perfluorovinyl ether derivatives represented by $CF_2=CF-OCH_2-Rf^7$ (wherein $Rf^7$ represents a C1-C5 perfluoroalkyl group).

The PFA has a lower melting point than the PTFE and it is preferably not lower than 180° C. but lower than 324° C., more preferably 230° C. to 320° C., and still more preferably 280° C. to 320° C.

The PFA preferably has a melt flow rate (MFR) of 0.1 to 500 g/10 min.

The MFR herein is a value determined by the method in conformity with ASTM D1238. It is determined at a measurement temperature and a load each depending on the type of the fluoropolymer (for example, the temperature is set at 372° C. for PFA and FEP and 297° C. for ETFE, and the load is set at 5 kg for PFA, FEP, and ETFE).

Any FEP can be used, and it is preferably a copolymer including a TFE unit and a HFP unit at a TFE/HFP mole ratio of not lower than 70/30 but lower than 99/1. The mole ratio is more preferably not lower than 70/30 but not higher than 98.9/1.1, and still more preferably not lower than 80/20 but not higher than 98.9/1.1. Too small an amount of the TFE unit tends to cause deteriorated mechanical properties, whereas too large an amount thereof tends to cause so high a melting point that the moldability tends to deteriorate. The FEP is also preferably a copolymer including 0.1 to 10 mol % of a monomer unit derived from a monomer copolymerizable with TFE and HFP and 90 to 99.9 mol % of the TFE unit and the HFP unit. Examples of the monomer copolymerizable with TFE and HFP include PAVE and alkyl perfluorovinyl ether derivatives.

The FEP has a lower melting point than the PTFE, and it is preferably not lower than 150° C. but lower than 324° C., more preferably 200° C. to 320° C., and still more preferably 240° C. to 320° C.

The FEP preferably has a MFR of 0.01 to 500 g/10 min.

The ETFE is preferably a copolymer including a TFE unit and an ethylene unit at a TFE/ethylene mole ratio of not lower than 20/80 but not higher than 90/10. The mole ratio is more preferably not lower than 37/63 but not higher than 85/15, and still more preferably not lower than 38/62 but not higher than 80/20. The ETFE may be a copolymer including TFE, ethylene, and a monomer copolymerizable with TFE and ethylene. Examples of the copolymerizable monomer include monomers represented by the formulas $CH_2=CX^5Rf^3$, $CF_2=CFRf^3$, $CF_2=CFORf^3$, and $CH_2=C(Rf^3)_2$ wherein $X^5$ represents a hydrogen atom or a fluorine atom; and $Rf^3$ represents a fluoroalkyl group optionally having an ether bond. Preferred among these are fluorovinyl monomers represented by the formulas $CF_2=CFRf^3$ and $CF_2=CFORf^3$, and $CH_2=CX^5Rf^3$. More preferred are HFP, perfluoro(alkyl vinyl ethers) represented by the formula $CF_2=CF-ORf^4$ (wherein $Rf^4$ represents a C1-C5 perfluoroalkyl group), and fluorovinyl monomers represented by the formula $CH_2=CX^5Rf^3$ (wherein $Rf^3$ represents a C1-C8 fluoroalkyl group). The monomer copolymerizable with TFE and ethylene may also be an unsaturated aliphatic carboxylic acid such as itaconic acid or itaconic anhydride. The amount of the monomer copolymerizable with TFE and ethylene is preferably 0.1 to 10 mol %, more preferably 0.1 to 5 mol %, and particularly preferably 0.2 to 4 mol %, based on the amount of the fluoropolymer.

The ETFE has a lower melting point than the PTFE, and it is preferably not lower than 140° C. but lower than 324° C., more preferably 160° C. to 320° C., and still more preferably 195° C. to 320° C.

The ETFE preferably has a MFR of 1 to 500 g/10 min.

The amounts of the respective monomer units in the aforementioned copolymer can be calculated by appropriate combination of NMR, FT-IR, elemental analysis, and X-ray fluorescence analysis in accordance with the types of the monomers.

The fluoropolymer is preferably not a fluorinated ionomer because it is difficult to apply a fluorinated ionomer to the use of the fluoropolymer aqueous dispersion to be mentioned later.

The fluoropolymer preferably has an equivalent weight (EW) of not less than 6,000. The equivalent weight (EW) is a dry weight per equivalent of an ion-exchange group. A high equivalent weight (EW) of the fluoropolymer indicates that the monomers constituting the fluoropolymer hardly include an ionomer. Even though the fluoropolymer particles to be produced in step (1) hardly include an ionomer, they have a significantly small volume average particle size. The equivalent weight (EW) is more preferably not less than 10,000. The EW may have any upper limit, and it is preferably not more than 50,000,000.

The method of producing an aqueous dispersion of fluoropolymer particles disclosed in Patent Literature 4 essentially includes forming dispersed particles of a fluorinated ionomer in the first stage. Thus, the finally produced fluoropolymer has poor heat resistance, and bubbles may be generated and staining may occur when the resulting fluoropolymer is heated. In the production method of the present invention, the equivalent weight (EW) of the resulting fluoropolymer in step (1) is not less than 6,000. Thus, the resulting polytetrafluoroethylene in step (2) has excellent heat resistance.

The equivalent weight can be determined as follows.

Hydrochloric acid or nitric acid is added to an aqueous dispersion containing a fluoropolymer so as to coagulate the fluoropolymer. The coagulated fluoropolymer is washed with pure water until the solution after the washing becomes neutral, and then heat dried in vacuo at 110° C. or lower until the moisture is removed. Then, 0.3 g of the dried fluoropolymer is immersed in 30 mL of a saturated NaCl aqueous solution at 25° C. and left to stand under stirring for 30 minutes. Next, the protons in the saturated NaCl aqueous solution are subjected to neutralization titration using a 0.01 N sodium hydroxide aqueous solution with a phenolphthalein indicator. The neutralization provides a fluoropolymer including a sodium ion as the counterion for the ion-exchange group. This fluoropolymer is rinsed with pure water, and then vacuum-dried and weighed. The equivalent weight EW (g/eq) is then determined by the following formula:

$$EW=(W/M)-22$$

wherein M (mmol) represents the amount of the sodium hydroxide used for neutralization and W (mg) represents the mass of the fluoropolymer including a sodium ion as the counterion for the ion-exchange group.

The polymerization initiator may be any initiator capable of generating radicals within the above range of the polymerization temperature, and any known oil-soluble and/or water-soluble polymerization initiators can be used. Further, the initiator may be combined with a reducing agent to form a redox agent, for example, and then starts the polymerization. The concentration of the polymerization initiator can appropriately be determined in accordance with the types of the monomers, the target molecular weight of a polymer, and the reaction rate.

The polymerization initiator is preferably at least one selected from the group consisting of persulfates and organic peroxides. In order to achieve good dispersion stability of the fluoropolymer particles in the aqueous dispersion, the polymerization initiator may be any of persulfates such as ammonium persulfate and potassium persulfate and water-soluble organic peroxides such as disuccinic acid peroxide and diglutamic acid peroxide.

In order to achieve good dispersion stability of fluoropolymer particles in the aqueous dispersion, the polymerization initiator is preferably used in an amount corresponding to 2 ppm or more of the aqueous medium.

The aqueous medium is a reaction medium where the polymerization proceeds, and is a liquid that contains water. The aqueous medium may be any medium that contains water, and it may be one containing water and, for example, any of fluorine-free organic solvents such as alcohols, ethers, and ketones, and/or fluorinated organic solvents having a boiling point of 40° C. or lower.

The polymerization in step (1) can be performed in the presence of a chain-transfer agent. The chain-transfer agent may be a known one. Examples thereof include saturated hydrocarbons such as methane, ethane, propane, and butane; halogenated hydrocarbons such as chloromethane, dichloromethane, and difluoroethane; alcohols such as methanol and ethanol; and hydrogen. The chain-transfer agent is preferably one which is in the gas state at room temperature and atmospheric pressure, and more preferably ethane or propane.

The amount of the chain-transfer agent is usually 1 to 50,000 ppm, and preferably 1 to 20,000 ppm, based on the sum of the amounts of the fluoromonomers supplied.

The chain-transfer agent may be added to a reactor at one time before the start of the polymerization, may be added in portions during the polymerization, or may continually be added during the polymerization.

The polymerization is preferably performed at 10° C. to 95° C., and more preferably not lower than 30° C. but not higher than 90° C.

The polymerization is preferably performed at 0.05 to 3.9 MPaG, and more preferably not lower than 0.1 MPaG but not higher than 3.0 MPaG.

The polymerization is performed as follows. Specifically, a fluoromonomer is put into a polymerization reactor. The contents of the reactor are stirred and the temperature in the reactor is maintained at a predetermined polymerization temperature. A polymerization initiator is added to the reactor to initiate the polymerization reaction. If necessary, components such as an aqueous medium and additives may be put into the reactor before the start of the polymerization reaction. After the start of the polymerization reaction, the fluoromonomer, the polymerization initiator, and the chain-transfer agent can additionally be added in accordance with the respective purposes.

The polymerization can provide an aqueous dispersion containing fluoropolymer particles. The resulting aqueous dispersion has a solids content of about 1 to 40% by mass. The solids content herein is determined as follows. Specifically, 1 g of the aqueous dispersion is dried in a forced air oven at 150° C. for 60 minutes, and the ratio (in terms of percentage) of the mass of residue after heating to the mass (1 g) of the aqueous dispersion is defined as the solids content.

For the aqueous dispersion containing fluoropolymer particles at a solids content of 5.0% by mass, the sediment amount of the fluoropolymer particles is preferably not more than 10.0% by mass, more preferably not more than 7.0% by mass, still more preferably not more than 5.5% by mass, and particularly preferably not more than 3.0% by mass. The lower limit thereof is not particularly limited.

The "sediment amount of the fluoropolymer particles" herein can be measured as follows, for example. First, 30 g of an aqueous dispersion maintained at 25° C. is put in a container for exclusive use, and then stirred at 5000 rpm for five minutes using a centrifuge (himac CT15D, Hitachi Koki Co., Ltd.) equipped with a rotor (type RT15A7), separating the sediment layer and the aqueous dispersion layer. The aqueous dispersion layer is isolated and the solids content is determined. The sediment amount is calculated from the difference between the solids content in the aqueous dispersion layer and the original solids content in the aqueous dispersion used. The sediment amount is determined in terms of a proportion (% by mass) in the fluoropolymer contained in the aqueous dispersion. The lower the proportion is, the better the storage stability is.

For the aqueous dispersion containing fluoropolymer particles at a solids content of 5.0% by mass, the measured mesh-up amount of the fluoropolymer particles is preferably not more than 2.5% by mass, more preferably not more than 2.0% by mass, still more preferably not more than 1.8% by mass, and particularly preferably not more than 1.3% by mass. The lower limit is not particularly limited.

The "mesh-up amount of the fluoropolymer particles" herein can be determined as follows, for example. First, 100 g of an aqueous dispersion maintained at 65° C. is circulated at a discharge flow rate of 10 L/h for two hours using a peristaltic pump (roller pump RP-2000, TOKYO RIKAKI- KAI CO., LTD.) equipped with a tube (Tygon tube) having an inner diameter of 4.76 mm and an outer diameter of 7.94 mm. Then, the aqueous dispersion is filtered through a 200-mesh SUS net. The amount of the substance remaining on the net is measured in terms of a proportion (% by mass) in the fluoropolymer contained in the aqueous dispersion. The lower the proportion is, the better the mechanical stability is.

The polymerization in step (1) is preferably performed in the absence of a fluorinated compound represented by the following formula (2):

$$X-(CF_2)_{m2}-Y \qquad (2)$$

wherein X represents H or F; m2 is an integer of 6 or greater; and Y represents $-SO_3M$, $-SO_4M$, $-SO_3R$, $-SO_4R$, $-COOM$, $-PO_3M_2$, or $-PO_4M_2$, where M represents H, $NH_4$, or an alkali metal, and R represents a C1-C12 alkyl group. The production method of the present invention can provide an aqueous dispersion containing fluoropolymer particles having a sufficiently small particle size without such a conventional long-chain fluorosurfactant.

The polymerization in step (1) is preferably emulsion polymerization. The polymerization in step (1) is preferably radical polymerization.

The polymerization in step (1) is preferably performed until the conversion rate of TFE reaches 10% or lower. The target conversion rate is more preferably 5% or lower, and still more preferably 1% or lower. The "conversion rate" herein means a ratio of the amount of TFE consumed until a certain point during the polymerization to the amount of TFE to be polymerized (the total amount of TFE required for forming PTFE particles in step (2)).

In the aqueous dispersion containing fluoropolymer particles produced in step (1), the number of fluoropolymer particles is preferably not less than $5 \times 10^{15}$ particles/cc. Such a large number of particles are advantageous in that the rate of polymerization increases so that the productivity of the fluoropolymer increases. The number of particles can be adjusted by adjusting the factors such as the amount of the fluorosurfactant, the stirring speed, and the amount of the fluoromonomer. The lower limit of the number of particles is more preferably $1 \times 10^{17}$ particles/cc. The upper limit is not particularly limited, and is preferably $5 \times 10^{21}$ particles/cc. The number of particles can be calculated by the following formula:

Number of polymer particles =

wherein the number of polymer particles is represented per 1 cc water, and the specific gravity is the measured specific gravity of the polymer synthesized in step (1). If the polymer synthesized in step (1) is PTFE, the applied specific gravity is 2.28.

After the step (1), the aqueous dispersion containing fluoropolymer particles is preferably heated in the absence of monomers. The heating treatment can deactivate the undecomposed residue of the polymerization initiator used in the step of producing the aqueous dispersion containing fluoropolymer particles. Such an undecomposed residue may lead to a polymerization reaction in the stage of preparation for the polymerization in step (2), possibly causing a side reaction. The heating conditions depend on the decomposing speed of the polymerization initiator used in step (1). Those rapidly decomposed can be heated at low temperature in a short time, and in the opposite case, the opposite happens. For persulfates, the heating treatment is preferably performed at 80° C. or higher for three hours or longer.

After the step (1), the method preferably includes an additional step (1-2) of preparing a diluted aqueous dispersion containing fluoropolymer particles by adding water to the aqueous dispersion produced in step (1). The step (1-2) enables the adjustment of the number of fluoropolymer particles in the aqueous dispersion to be used in step (2) and the concentration of the fluorosurfactant.

In the step (1-2), the number of fluoropolymer particles is preferably adjusted to not less than $5 \times 10^{14}$ particles/cc but not more than $1 \times 10^{19}$ particles/cc. The number of particles is more preferably not less than $1 \times 10^{15}$ particles/cc. Too large a number of particles may lead to a requirement of using a large amount of fluorosurfactant so as to stabilize the fluoropolymer particles in step (2). Too small a number of particles may decrease the rate of polymerization and cause a larger amount of the polymer to stick to the agitator.

The number of fluoropolymer particles in the aqueous dispersion obtained in the step (1-2) can be calculated by the following formula.

[(Number of fluoropolymer particles in aqueous dispersion obtained in step (1))×(mass of aqueous dispersion obtained in step (1) to be used in step (2))×{100−(solids content of aqueous dispersion obtained in step (1)}/100]/(mass of aqueous medium in aqueous dispersion immediately before start of step (2))

The "mass of aqueous medium in aqueous dispersion immediately before start of step (2)" is the mass of the aqueous medium in the aqueous dispersion immediately after the polymerization initiator is first put into the reactor in step (2), and it includes the masses of those put into the aqueous dispersion produced in step (1) such as water and the aqueous medium in which the polymerization initiator is dissolved.

Step (1) is preferably followed by a step of releasing the pressure. Such pressure release leads to removal of substantially the whole amount of olefinic comonomers from the reaction system. If tetrafluoroethylene alone or tetrafluoroethylene and a modifying monomer are added to the reaction system in step (2) to be mentioned later after the pressure release, a layer containing the tetrafluoroethylene unit is presumably formed so as to cover the outer surfaces of granular materials formed before the pressure release.

The pressure in the reaction system at the pressure release can usually be an atmospheric pressure of 0.1 MPa.

In step (2), tetrafluoroethylene alone or tetrafluoroethylene and a modifying monomer is/are polymerized in an aqueous medium in the presence of the fluoropolymer particles produced in step (1) and a polymerization initiator to provide an aqueous dispersion containing PTFE particles.

Examples of the modifying monomer copolymerizable with tetrafluoroethylene in step (2) include the same modifying monomers exemplified for the step (1). If a modifying monomer is used in step (1), the modifying monomer to be used in step (2) may be the same as or different from the modifying monomer used in step (1).

The amount of the modifying monomer is preferably 0.001 to 2 mol %, and more preferably 0.001 to 1 mol %, of the total amount of the tetrafluoroethylene and the modifying monomer.

Examples of the polymerization initiator to be used in step (2) include the same polymerization initiators as exemplified for the step (1). The polymerization initiator to be used in step (2) may be the same as or different from the polymerization initiator used in step (1).

The amount of the polymerization initiator to be used in step (2) is appropriately adjusted such that the reaction time is within the range that allows the PTFE particles to keep good dispersion stability in the aqueous dispersion.

Examples of the aqueous medium to be used in step (2) include the same aqueous media exemplified for the step (1). The aqueous medium to be used in step (2) may be the same as or different from the aqueous medium used in step (1).

The polymerization in step (2) can be performed in the presence of a chain-transfer agent. Examples of the chain-transfer agent include the same chain-transfer agents exemplified for the step (1). If a chain-transfer agent is used in step (1), the chain-transfer agent to be used in step (2) may be the same as or different from the chain-transfer agent used in step (1).

The amount of the chain-transfer agent to be used in step (2) is usually 1 to 50,000 ppm, and preferably 1 to 20,000 ppm, based on the sum of the amounts of the tetrafluoroethylene and the modifying monomer supplied.

The chain-transfer agent may be added to a reactor at one time before the start of the polymerization, may be added in portions during the polymerization, or may continually be added during the polymerization.

The polymerization in step (2) is preferably performed at 10° C. to 95° C., and more preferably not lower than 30° C. or higher but not higher than 90° C.

The polymerization in step (2) is preferably performed at 0.4 to 3.9 MPaG, and more preferably not lower than 0.6 MPaG but not higher than 3.0 MPaG.

The polymerization in step (2) is performed as follows. Specifically, the fluoropolymer particles produced in step (1) is put into a polymerization reactor. The contents in the reactor are stirred and the temperature in the reactor is maintained at a predetermined polymerization temperature. A polymerization initiator is added to the reactor to initiate the polymerization reaction. The fluoropolymer particles obtained in step (1) can be put into the polymerization reactor by putting the aqueous dispersion containing fluoropolymer particles produced in step (1) into the polymerization reactor. If necessary, components such as an aqueous medium, a surfactant, and any additives may be put into the reactor before the start of the polymerization reaction. After the start of the polymerization reaction, the tetrafluoroethylene, the modifying monomer, the polymerization initiator, the surfactant, the chain-transfer agent, and the other components can additionally be added in accordance with the respective purposes.

In the polymerization in step (2), the amount of the fluoropolymer particles in the aqueous medium at the start of the polymerization reaction preferably corresponds to 10 to 50,000 ppm of the aqueous medium. The amount more preferably corresponds to 50 to 10,000 ppm thereof. The amount of the fluoropolymer particles in the aqueous medium at the start of the polymerization reaction can be adjusted by appropriately mixing additional aqueous medium to the aqueous dispersion containing fluoropolymer particles obtained in step (1) in the polymerization reactor.

The surfactant to be used in the polymerization in step (2) can be the aforementioned fluorosurfactant having a Log POW value of not higher than 3.4. The surfactant to be used in step (2) may be the same as or different from the surfactant used in step (1).

The amount of the surfactant to be used in the polymerization in step (2) preferably corresponds to 10 to 10,000 ppm of the aqueous medium. The amount more preferably corresponds to 50 to 5,000 ppm thereof.

The polymerization in step (2) is preferably performed in the absence of a fluorinated compound represented by the following formula (2):

$$X-(CF_2)_{m2}-Y \quad (2)$$

wherein X represents H or F; m2 is an integer of 6 or greater; and Y represents —SO$_3$M, —SO$_4$M, —SO$_3$R, —SO$_4$R, —COOM, —PO$_3$M$_2$, or —PO$_4$M$_2$, where M represents H, NH$_4$, or an alkali metal, and R represents a C1-C12 alkyl group. The production method of the present invention can provide an aqueous dispersion containing PTFE particles having a sufficiently small particle size without such a conventional long-chain fluorosurfactant.

The polymerization in step (2) is preferably emulsion polymerization. The polymerization in step (2) is also preferably radical polymerization.

It is one preferable embodiment of the present invention to perform the polymerization in the steps (1) and (2) in the absence of a fluorinated compound represented by the following formula (2):

$$X-(CF_2)_{m2}-Y \quad (2)$$

wherein X represents H or F; m2 is an integer of 6 or greater; and Y represents —SO$_3$M, —SO$_4$M, —SO$_3$R, —SO$_4$R, —COOM, —PO$_3$M$_2$, or —PO$_4$M$_2$, where M represents H, NH$_4$, or an alkali metal, and R represents a C1-C12 alkyl group.

The PTFE particles produced in step (2) preferably have an average primary particle size of 100 to 500 nm. The upper limit of the average primary particle size is preferably 400 nm.

The average primary particle size is a value indirectly determined by the above transmittance on the basis of the calibration curve between the transmittance of incident light (550 nm) to the unit length of the PTFE aqueous dispersion adjusted to have a solids content of 0.22% by mass and the average primary particle size determined using a transmission-type electron microscopic image. The average primary particle size is the average particle size of the dispersed particles in the state of primary particles.

The PTFE particles preferably have a standard specific gravity (SSG) of 2.000 to 2.300. The lower limit of the SSG is preferably 2.100, whereas the upper limit thereof is preferably 2.280.

The SSG is determined in conformity with ASTM D1457-69.

The PTFE particles preferably have a melting point of 324° C. to 350° C., and more preferably 324° C. to 348° C.

The PTFE particles have a core-shell structure. The core-shell structure presumably has a core part of the fluoropolymer particles produced in step (1) and the shell part of the polytetrafluoroethylene or the modified polytetrafluoroethylene formed in step (2).

The PTFE particles preferably include 0.001 to 15% by mass, and more preferably 0.05 to 10% by mass, of the core part based on the amount of the particles. Too large an amount of the core part may fail to give desired characteristics to the PTFE particles. Too small an amount of the core part may deteriorate the productivity. The amount of the core part in the PTFE particles can be calculated from the polymerization conditions.

In other words, in the production method of the present invention, the steps (1) and (2) are preferably performed such that the amount of the core part in the PTFE particles falls within the above range.

In step (2), the aforementioned polymerization can provide an aqueous dispersion containing PTFE particles. The resulting aqueous dispersion has a solids content of about 10 to 40% by mass. The solids content herein is determined as follows. Specifically, 1 g of the aqueous dispersion is dried in a forced air oven at 150° C. for 60 minutes, and the ratio (in terms of percentage) of the mass of residue after heating to the mass (1 g) of the aqueous dispersion is defined as the solids content.

Further, the production method may include a step (I) of bringing the PTFE aqueous dispersion produced by the production method of the present invention into contact with an anion exchange resin in the presence of a nonionic surfactant, and a step (II) of condensing the aqueous dispersion produced in the step (I) such that the solids content in the aqueous dispersion is adjusted to 30 to 70% by mass based on 100% by mass of the aqueous dispersion. Such a method can provide a PTFE aqueous dispersion free of fluorosurfactant and having a high solids content. The solids content herein is determined as follows. Specifically, 1 g of the aqueous dispersion is dried in a forced air oven at 380° C. for 60 minutes, and the ratio (in terms of percentage) of the mass of residue after heating to the mass (1 g) of the aqueous dispersion is defined as the solids content.

The aqueous dispersion can be brought into contact with an anion exchange resin by a conventionally known method. The aqueous dispersion can be condensed by the aforementioned method, for example.

The production method of the present invention preferably further includes a step of separating and collecting the PTFE aqueous dispersion from the anion exchange resin after the step (I).

The nonionic surfactant can be any known fluorine-free nonionic compound. Examples of the nonionic surfactant include: ether-type nonionic surfactants such as polyoxyethylene alkyl phenyl ethers, polyoxyethylene alkyl ethers, and polyoxyethylene alkylene alkyl ethers; polyoxyethylene derivatives such as ethylene oxide/propylene oxide block copolymers; ester-type nonionic surfactants such as sorbitan fatty acid esters, polyoxyethylene sorbitan fatty acid esters, polyoxyethylene sorbitol fatty acid esters, glycerin fatty acid esters, and polyoxyethylene fatty acid esters; and amine-type nonionic surfactants such as polyoxyethylene alkylamines and alkyl alkanolamides. These surfactants are non-fluorinated nonionic surfactants.

The hydrophobic group in the compound constituting the nonionic surfactant can be any of alkyl phenol groups, linear alkyl groups, and branched alkyl groups. It is preferably a compound free of benzene ring, such as a compound having no alkyl phenol group in the structure.

The nonionic surfactant is particularly preferably a polyoxyethylene alkyl ether. The polyoxyethylene alkyl ether is preferably one comprising a polyoxyethylene alkyl ether structure having a C10-C20 alkyl group, and more preferably one comprising a polyoxyethylene alkyl ether structure having a C10-C15 alkyl group. The alkyl group in the polyoxyethylene alkyl ether structure preferably has a branched structure.

Examples of commercially available products of the polyoxyethylene alkyl ethers include Genapol X080 (trade name, Clariant), TERGITOL 9-S-15 (trade name, Clariant), NOIGEN TDS-80 (trade name, DKS Co., Ltd.), and LEOCOL TD-90 (trade name, Lion Corp.).

The PTFE aqueous dispersion produced by the production method of the present invention can be applied to base materials as it is or optionally in admixture with any additives, thereby providing various coated articles such as those exemplified below. Examples of the coated articles include cookware such as frying pans, electric skillets, pressure cookers, various other pots, rice cookers, mochi (rice cake) makers, ovens, hot plates, bread pans, knives, and gas cooktops; food and beverage containers such as electric kettles and ice trays; components for the food industry such as mixing rolls, rolling mill rolls, conveyors, and hoppers; industrial components such as rolls for office automation (OA) equipment, belts for OA equipment, separation claws for OA equipment, paper-making rolls, and calender rolls for film making; metal molds such as metal molds for molding expanded polystyrene, casting molds, and releasing plates for producing plywood and smoothly planned board; kitchen supplies such as cooking range hoods; equipment for producing frozen food such as conveyor belts; tools such as saws, files, dies, and gimlets; household utensils such as irons, scissors, and knives; metal foil and electric wiring; sliding bearings for food processing equipment, packaging machinery, and spinning and weaving machinery; sliding components for cameras and watches; automobile components such as pipes, valves, and bearings; snow shovels, spades, chutes, the bottoms of ships, boilers, and industrial containers (especially for the semiconductor industry).

The PTFE aqueous dispersion can also be used for immersion of porous supports (e.g., nonwoven fabric, resin molded articles) including the steps of immersing the support into the aqueous dispersion, drying the wet support, and preferably firing the dried support; and casting film formation including the steps of applying the aqueous dispersion onto a base (e.g., glass), drying the dispersion layer, optionally immersing the base in water, and peeling the film off the base. Application examples thereof include aqueous dispersion paints, binding agents for electrodes, and water-repellents for electrodes.

The PTFE aqueous dispersion can also preferably be used as a processing aid. When it is used as a processing aid, the PTFE aqueous dispersion may be mixed with, for example, a host polymer to improve the melting strength of the host polymer in melt processing, and to improve the mechanical strength, electric characteristics, incombustibility, drip prevention, and slidability of the resulting polymer.

The PTFE aqueous dispersion can also preferably be combined with a hot-melt-processible fluororesin to serve as a processing aid. The PTFE aqueous dispersion is suitable as a material of PTFE disclosed in, for example, JP H11-49912 A, JP 2003-24693 A, U.S. Pat. No. 5,804,654, JP H11-29679 A, and JP 2003-2980 A.

The PTFE aqueous dispersion can also preferably be used as a dust inhibitor. The dust inhibitor can be used in methods of inhibiting dust generation from dust-generating materials as disclosed in, for example, JP 2827152 B and JP 2538783 B, such as a method in which the dust inhibitor is mixed with a dust-generating material and the mixture is subjected to compression and shearing at a temperature of 20° C. to 200° C. so that polytetrafluoroethylene is fibrillated, thereby inhibiting the dust generation. The dust inhibitor can suitably be used for dust inhibiting treatment in the fields of construction materials, soil stabilizing materials, solidifying materials, fertilizers, landfill of incineration ash and hazardous materials, explosion protection, and cosmetics.

The PTFE aqueous dispersion can suitably be used for a dust inhibitor composition as disclosed in, for example, WO 2007/004250, and can also suitably be used in a dust inhibiting method as disclosed in WO 2007/000812.

The PTFE aqueous dispersion can also preferably be used as a material for producing polytetrafluoroethylene fibers by the dispersion spinning method. The dispersion spinning method is a method of producing polytetrafluoroethylene fibers including the steps of mixing the polytetrafluoroethylene aqueous dispersion and an aqueous dispersion of a polymer matrix, extruding the mixture to form an intermediate fibrous structure, and firing the intermediate fibrous structure to decompose the polymer matrix and to sinter the polytetrafluoroethylene particles, thereby providing polytetrafluoroethylene fibers.

Further, PTFE fine powder can also be produced by coagulating the PTFE aqueous dispersion produced by the production method of the present invention, washing the resulting coagulated particles, and drying the washed particles.

The above coagulation, washing, and drying can be performed by conventionally known methods.

The fine powder can suitably be used as molding materials and additives for tubes, electric wire coating, sealing components, packing, sliding components, and other components.

The PTFE aqueous dispersion can preferably be formed into co-coagulated powder by mixing the aqueous dispersion with an aqueous dispersion of hot-melt-processible fluororesin and coagulating the polymers. The co-coagulated powder is suitable as a processing aid. Examples of the hot-melt-processible fluororesin include tetrafluoroethylene/hexafluoropropylene copolymers (FEP), tetrafluoroethylene/perfluoro(alkyl vinyl ether) copolymers (PFA), ethylene/tetrafluoroethylene copolymers (ETFE), and ethylene/tetrafluoroethylene/hexafluoropropylene copolymers (EFEP). FEP is preferred.

EXAMPLES

Next, the present invention is described below referring to, but not limited to, examples.

The values in the examples are determined as follows.
(Average Particle Size)
(Volume Average Particle Size)

The volume average particle size is measured by dynamic light scattering. A fluoropolymer aqueous dispersion having a fluoropolymer solids content of 1.0% by mass was prepared. The measurement was performed using ELSZ-1000S (Otsuka Electronics Co., Ltd.) at 25° C. with 70 accumulations. The refractive index of the solvent (water) was 1.3328 and the viscosity of the solvent (water) was 0.8878 mPa·s.
(Average Primary Particle Size)

The average primary particle size was indirectly determined from the transmittance of incident light (550 nm) to the unit length of the PTFE aqueous dispersion adjusted to have a solids content of 0.22% by mass on the basis of the calibration curve between the above transmittance and the average primary particle size determined by the transmission electron microscopic image.
(Melt Viscosity (MV))

The melt viscosity was determined as follows. Specifically, 2 g of a sample was preliminarily heated for five minutes at a measurement temperature (380° C.), and then the value was measured at the maintained temperature with a load of 0.7 MPa using a flow tester (Shimadzu Corp.) and a 2φ-8 L die in conformity with ASTM D1238.
(Modified Amount)

The modified amount was determined by appropriate combination of NMR, FT-IR, elemental analysis, and X-ray fluorescence analysis in accordance with the types of monomers.
(Melting Point)

The melting point was determined as a temperature corresponding to the local maximum on a heat-of-fusion curve drawn using a differential scanning calorimeter (DSC) at a temperature-increasing rate of 10° C./min.

(Solids Content)

The solids content of the pre-condensation aqueous dispersion obtained by polymerization was a value corresponding to the ratio (in terms of percentage) of the mass of residue after heating (which was prepared by drying 1 g of the aqueous dispersion in a forced air oven at 150° C. for 60 minutes) to the mass (1 g) of the aqueous dispersion.

The solids content of the condensed aqueous dispersion was a value corresponding to the ratio (in terms of percentage) of the mass of residue after heating (which was prepared by drying 1 g of the aqueous dispersion in a forced air oven at 380° C. for 60 minutes) to the mass (1 g) of the aqueous dispersion.
(Standard Specific Gravity (SSG))

The SSG was determined in conformity with ASTM D1457-69.
(Melt Flow Rate (MFR))

The MFR was determined by the method in conformity with ASTM D1238 at a predetermined measurement temperature and load depending on the type of the fluoropolymer (for example, the temperature was 372° C. for PFA and FEP and 297° C. for ETFE, and the load was 5 kg for PFA, FEP, and ETFE).
(Evaluation of Dispersion Stability)
(Storage Stability Test)

First, 30 g of the fluoropolymer aqueous dispersion maintained at 25° C. was put in a container for exclusive use, and then stirred using a centrifuge (himac CT15D, Hitachi Koki Co., Ltd.) equipped with a rotor (type RT15A7) at 5000 rpm for five minutes, separating the sediment layer and the fluoropolymer aqueous dispersion layer. The fluoropolymer aqueous dispersion layer was isolated and the solids content was determined. The sediment amount was calculated from the difference between the solids content in the fluoropolymer aqueous dispersion layer and the original solids content in the fluoropolymer aqueous dispersion used. The sediment amount was measured as a proportion (% by mass) in the fluoropolymer contained in the fluoropolymer aqueous dispersion used. The lower the proportion is, the better the storage stability is.
(Mechanical Stability Test)

First, 100 g of the fluoropolymer aqueous dispersion maintained at 65° C. was circulated at a discharge flow rate of 10 L/h for two hours using a peristaltic pump (roller pump RP-2000, TOKYO RIKAKIKAI CO, LTD.) equipped with a tube (Tygon tube) having an inner diameter of 4.76 mm and an outer diameter of 7.94 mm. Then, the fluoropolymer aqueous dispersion was filtered through a 200-mesh SUS net. The proportion (% by mass) of the oversize fraction to the fluororesin in the aqueous fluoropolymer aqueous dispersion used was determined. The lower the proportion is, the better the mechanical stability is.

(1) 1st Stage

Synthesis Example 1

A 1-L glass reactor equipped with a stirrer was charged with 530 g of deionized water, 30 g of paraffin wax, and 55.0 g of an ammonium perfluorohexanoate (APFH) dispersant. Next, the contents of the reactor were heated up to 85° C. and sucked, then simultaneously the reactor was purged with a TFE monomer, thereby removing the oxygen in the reactor. Then, 0.03 g of ethane gas was added to the reactor, and the contents were stirred at 540 rpm. The TFE monomer was added to the reactor until the inner pressure reached 0.73 MPaG. An initiator prepared by dissolving 0.11 g of ammonium persulfate (APS) in 20 g of deionized water was charged into the reactor, and the pressure in the reactor was adjusted to 0.83 MPaG. The charging of the initiator was followed by a decrease in the pressure, which means that the start of the polymerization was observed. The TFE monomer was added to the reactor to keep the pressure, and the polymerization was continued until about 140 g of the TFE monomer was consumed in the reaction. Thereafter, the air in the reactor was discharged until the pressure reached normal pressure. The contents were then taken out of the reactor and cooled down. Supernatant paraffin wax was removed from the resulting PTFE aqueous dispersion.

The resulting PTFE aqueous dispersion had a solids content of 20.5% by mass and a volume average particle size of 0.9 nm.

A portion of the PTFE aqueous dispersion was frozen in a freezer. The frozen portion of the PTFE aqueous dispersion was left to stand until the temperature reached 25° C., and thereby a coagulated powder was obtained. The wet coagulated powder was dried at 150° C. for 18 hours. The PTFE powder at this time had a melt viscosity of $3.0 \times 10^3$ Pa·S and a melting point of 327.0° C.

Deionized water was added to the PTFE aqueous dispersion to adjust the solids content to 5.0% by mass, and the storage stability thereof was evaluated. The sediment amount was 0.1% by mass.

APFH, which is the same dispersant as used in the polymerization, was added to the PTFE aqueous dispersion to adjust the amount of the dispersant to 10.0% by mass. Deionized water was further added to the dispersion to adjust the solids content to 5.0% by mass, and the mechanical stability was evaluated. The mesh-up amount was 0.1% by mass.

Synthesis Example 2

The polymerization was performed in the same manner as in Synthesis Example 1 except that the polymerization temperature was not 85° C. as in Synthesis Example 1 but 70° C.

Synthesis Example 3

The polymerization was performed in the same manner as in Synthesis Example 1 except that the amount of the ammonium persulfate (APS) initiator was not 0.11 g as in Synthesis Example 1 but 0.006 g.

Synthesis Example 4

The polymerization was performed in the same manner as in Synthesis Example 1 except that the amount of the ammonium persulfate (APS) initiator was not 0.11 g as in Synthesis Example 1 but 0.003 g.

Synthesis Example 5

The polymerization was performed in the same manner as in Synthesis Example 1 except that the amount of the ammonium persulfate (APS) initiator was not 0.11 g as in Synthesis Example 1 but 0.028 g.

Synthesis Example 6

The polymerization was performed in the same manner as in Synthesis Example 1 except that the amount of the ammonium persulfate (APS) initiator was not 0.11 g as in Synthesis Example 1 but 0.006 g and the polymerization was continued until about 185 g of the TFE monomer was consumed in the reaction.

Synthesis Example 7

The polymerization was performed in the same manner as in Synthesis Example 1 except that the amount of the ammonium persulfate (APS) initiator was not 0.11 g as in Synthesis Example 1 but 0.006 g, the amount of the ammonium perfluorohexanoate (APFH) dispersant was not 55.0 g but 26.4 g, and the polymerization was continued until about 10 g of the TFE monomer was consumed in the reaction.

Synthesis Example 8

The polymerization was performed in the same manner as in Synthesis Example 1 except that the amount of the ammonium persulfate (APS) initiator was not 0.11 g as in Synthesis Example 1 but 0.006 g, the amount of the ethane gas was not 0.03 g but 0.01 g, the maintained pressure in the reactor was not 0.83 MPaG but 0.20 MPaG, and the polymerization was continued until about 40 g of the TFE monomer was consumed in the reaction.

Synthesis Example 9

The polymerization was performed in the same manner as in Synthesis Example 1 except that the amount of the ammonium persulfate (APS) initiator was not 0.11 g as in Synthesis Example 1 but 0.006 g, 55.0 g of the ammonium perfluorohexanoate (APFH) dispersant was replaced by 22.0 g of an ammonium 2,3,3,3-tetrafluoro-2-[1,1,2,3,3,3-hexafluoro-2-(trifluoromethoxy)propoxy]-propanoate ($CF_3OCF(CF_3)CF_2OCF(CF_3)COONH_4$) (PMPA) dispersant, and the polymerization was continued until about 40 g of the TFE monomer was consumed in the reaction.

Synthesis Example 10

The polymerization was performed in the same manner as in Synthesis Example 9 except that the amount of the ammonium 2,3,3,3-tetrafluoro-2-[1,1,2,3,3,3-hexafluoro-2-(trifluoromethoxy)propoxy]-propanoate ($CF_3OCF(CF_3)CF_2OCF(CF_3)COONH_4$) (PMPA) dispersant was not 22.0 g as in Synthesis Example 9 but 16.5 g.

Synthesis Example 11

The polymerization was performed in the same manner as in Synthesis Example 9 except that the amount of the ammonium 2,3,3,3-tetrafluoro-2-[1,1,2,3,3,3-hexafluoro-2-(trifluoromethoxy)propoxy]-propanoate ($CF_3OCF(CF_3)CF_2OCF(CF_3)COONH_4$) (PMPA) dispersant was not 22.0 g as in Synthesis Example 9 but 11.0 g.

Synthesis Example 12

The polymerization was performed in the same manner as in Synthesis Example 9 except that the amount of the ammonium 2,3,3,3-tetrafluoro-2-[1,1,2,3,3,3-hexafluoro-2-(trifluoromethoxy)propoxy]-propanoate ($CF_3OCF(CF_3)CF_2OCF(CF_3)COONH_4$) (PMPA) dispersant was not 22.0 g as in Synthesis Example 9 but 9.9 g.

Synthesis Example 13

The polymerization was performed in the same manner as in Synthesis Example 9 except that 22.0 g of the ammonium 2,3,3,3-tetrafluoro-2-[1,1,2,3,3,3-hexafluoro-2-(trifluoromethoxy)propoxy]-propanoate ($CF_3OCF(CF_3)CF_2OCF$ (CF$_3$)COONH$_4$) (PMPA) dispersant as in Synthesis Example 9 was replaced by 110.0 g of an ammonium perfluoropentanoate dispersant (APFP), and the polymerization was continued until about 140 g of the TFE monomer was consumed in the reaction.

Synthesis Example 14

A 1-L glass reactor equipped with a stirrer was charged with 530 g of deionized water, 30 g of paraffin wax, and 55.0 g of an ammonium perfluorohexanoate (APFH) dispersant. Next, the contents of the reactor were heated up to 85° C. and sucked, then simultaneously the reactor was purged with a TFE monomer, thereby removing the oxygen in the reactor. Then, 0.03 g of ethane gas and 1.12 g of perfluoro[3-(1-methyl-2-vinyloxy-ethoxy)propionitrile] (hereinafter, abbreviated as CNVE) were added to the reactor, and the contents were stirred at 540 rpm. The TFE monomer was added to the reactor until the inner pressure reached 0.73 MPaG. An initiator prepared by dissolving 0.11 g of ammonium persulfate (APS) in 20 g of deionized water was charged into the reactor, and the pressure in the reactor was adjusted to 0.83 MPaG. The charging of the initiator was followed by a decrease in the pressure, which means that the start of the polymerization was observed. The TFE monomer was added to the reactor to keep the pressure, and the polymerization was continued until about 140 g of the TFE monomer was consumed in the reaction. Thereafter, the air in the reactor was discharged until the pressure reached normal pressure. The contents were then taken out of the reactor and cooled down. Supernatant paraffin wax was removed from the resulting PTFE aqueous dispersion.

The resulting PTFE aqueous dispersion had a solids content of 19.9% by mass and a volume average particle size of 1.3 nm.

The PTFE aqueous dispersion was frozen in a freezer. The frozen PTFE aqueous dispersion was left to stand until the temperature reached 25° C., and thereby a coagulated powder was obtained. The wet coagulated powder was vacuum dried at 70° C. for 50 hours. The PTFE powder at this time was hardly in flux even under heating, so that the melt viscosity thereof was impossible to measure. The melting point thereof was 327.0° C. and the CNVE modifying amount thereof was 0.20 mol %.

Synthesis Example 15

The polymerization was performed in the same manner as in Synthesis Example 14 except that 0.03 g of the ethane gas as in Synthesis Example 14 was not added.

Synthesis Example 16

The polymerization was performed in the same manner as in Synthesis Example 14 except that the polymerization temperature was not 85° C. as in Synthesis Example 14 but 70° C.

Synthesis Example 17

The polymerization was performed in the same manner as in Synthesis Example 14 except that the amount of the ammonium persulfate (APS) initiator was not 0.11 g as in Synthesis Example 14 but 0.006 g and 1.12 g of the CNVE was replaced by 0.20 g of 3,3,4,4,5,5,6,6,7,7,8,8,8-tridecafluorooct-1-ene (PFHE).

Synthesis Example 18

The polymerization was performed in the same manner as in Synthesis Example 14 except that the amount of the ammonium persulfate (APS) initiator was not 0.11 g as in Synthesis Example 14 but 0.006 g, 1.12 g of the CNVE was replaced by 0.20 g of HFP, and 0.03 g of the ethane gas was not added.

Synthesis Example 19

The polymerization was performed in the same manner as in Synthesis Example 14 except that the amount of the ammonium persulfate (APS) initiator was not 0.11 g as in Synthesis Example 14 but 0.006 g, 1.12 g of the CNVE was replaced by 0.12 g of PMVE, 0.03 g of the ethane gas was not added, and the polymerization was continued until about 40 g of the TFE monomer was consumed in the reaction.

Synthesis Example 20

The polymerization was performed in the same manner as in Synthesis Example 19 except that 0.12 g of the PMVE as in Synthesis Example 19 was replaced by 0.46 g of PPVE.

Synthesis Example 21

The polymerization was performed in the same manner as in Synthesis Example 19 except that 0.12 g of the PMVE as in Synthesis Example 19 was replaced by 0.18 g of CTFE.

Synthesis Example 22

The polymerization was performed in the same manner as in Synthesis Example 19 except that the amount of the PMVE was not 0.12 g as in Synthesis Example 19 but 0.01 g and the maintained pressure in the reactor was not 0.83 MPaG but 0.20 MPaG.

Synthesis Example 23

The polymerization was performed in the same manner as in Synthesis Example 16 except that 55.0 g of the ammonium perfluorohexanoate (APFH) dispersant as in Synthesis Example 16 was replaced by 27.5 g of an ammonium 2,3,3,3-tetrafluoro-2-[1,1,2,3,3,3-hexafluoro-2-(trifluoromethoxy)propoxy]-propanoate (CF$_3$OCF(CF$_3$)CF$_2$OCF(CF$_3$)COONH$_4$) (PMPA) dispersant.

Synthesis Example 24

The polymerization was performed in the same manner as in Synthesis Example 14 except that 1.12 g of the CNVE as in Synthesis Example 14 was replaced by 8.80 g of PPVE and the polymerization was continued until about 120 g of the TFE monomer was consumed in the reaction.

The resulting PFA aqueous dispersion had a solids content of 18.5% by mass and a volume average particle size of 6.0 nm.

A portion of the PFA aqueous dispersion was frozen in a freezer. The frozen portion of the PFA aqueous dispersion was left to stand until the temperature reached 25° C., and thereby coagulated powder was obtained. The wet coagulated powder was dried at 150° C. for 18 hours. The PFA powder at this time had a melt flow rate of 230 g/10 min, a melting point of 319.7° C., and a PPVE modifying amount of 1.49 mol %.

Synthesis Example 25

The polymerization was performed in the same manner as in Synthesis Example 24 except that the amount of the PPVE was not 8.80 g as in Synthesis Example 24 but 5.90 g and the amount of the ethane gas was not 0.03 g but 0.02 g.

Synthesis Example 26

The polymerization was performed in the same manner as in Synthesis Example 9 except that the amount of the ammonium 2,3,3,3-tetrafluoro-2-[1,1,2,3,3,3-hexafluoro-2-(trifluoromethoxy)propoxy]-propanoate ($CF_3OCF(CF_3)CF_2OCF(CF_3)COONH_4$) (PMPA) dispersant was not 22.0 g as in Synthesis Example 9 but 8.3 g.

The resulting PTFE aqueous dispersion had a solids content of 7.1% by mass and a volume average particle size of 121.6 nm.

The dispersion stability of the resulting PTFE aqueous dispersion was evaluated, resulting in poor mechanical stability and poor storage stability.

Tables 1 and 2 show the polymerization conditions and the evaluation results of the respective PTFE aqueous dispersions in the respective synthesis examples.

TABLE 1

| | Temperature °C. | Pressure MPaG | Initiator Type | Initiator Amount g | Emulsifying agent Type | Emulsifying agent Amount g | Modifying agent Type | Modifying agent Amount g | Chain-transfer agent Type | Chain-transfer agent Amount g |
|---|---|---|---|---|---|---|---|---|---|---|
| Synthesis Example 1 | 85 | 0.83 | APS | 0.110 | APFH | 55.0 | — | — | Ethane | 0.03 |
| Synthesis Example 2 | 70 | 0.83 | APS | 0.110 | APFH | 55.0 | — | — | Ethane | 0.03 |
| Synthesis Example 3 | 85 | 0.83 | APS | 0.006 | APFH | 55.0 | — | — | Ethane | 0.03 |
| Synthesis Example 4 | 85 | 0.83 | APS | 0.003 | APFH | 55.0 | — | — | Ethane | 0.03 |
| Synthesis Example 5 | 85 | 0.83 | APS | 0.028 | APFH | 55.0 | — | — | Ethane | 0.03 |
| Synthesis Example 6 | 85 | 0.83 | APS | 0.006 | APFH | 55.0 | — | — | Ethane | 0.03 |
| Synthesis Example 7 | 85 | 0.83 | APS | 0.006 | APFH | 26.4 | — | — | Ethane | 0.03 |
| Synthesis Example 8 | 85 | 0.20 | APS | 0.006 | APFH | 55.0 | — | — | Ethane | 0.01 |
| Synthesis Example 9 | 85 | 0.83 | APS | 0.008 | PMPA | 22.0 | — | — | Ethane | 0.03 |
| Synthesis Example 10 | 85 | 0.83 | APS | 0.006 | PMPA | 16.5 | — | — | Ethane | 0.03 |
| Synthesis Example 11 | 85 | 0.83 | APS | 0.006 | PMPA | 11.0 | — | — | Ethane | 0.03 |
| Synthesis Example 12 | 85 | 0.83 | APS | 0.006 | PMPA | 9.9 | — | — | Ethane | 0.03 |
| Synthesis Example 13 | 85 | 0.83 | APS | 0.006 | APFP | 110.0 | — | — | Ethane | 0.03 |
| Synthesis Example 14 | 85 | 0.83 | APS | 0.110 | APFH | 55.0 | CNVE | 1.12 | Ethane | 0.03 |
| Synthesis Example 15 | 85 | 0.83 | APS | 0.110 | APFH | 55.0 | CNVE | 1.12 | — | — |
| Synthesis Example 16 | 70 | 0.83 | APS | 0.110 | APFH | 55.0 | CNVE | 1.12 | Ethane | 0.03 |
| Synthesis Example 17 | 85 | 0.83 | APS | 0.006 | APFH | 55.0 | PFHE | 0.20 | Ethane | 0.03 |
| Synthesis Example 18 | 85 | 0.83 | APS | 0.006 | APFH | 55.0 | HFP | 0.20 | — | — |
| Synthesis Example 19 | 85 | 0.83 | APS | 0.006 | APFH | 55.0 | PMVE | 0.12 | — | — |
| Synthesis Example 20 | 85 | 0.83 | APS | 0.006 | APFH | 55.0 | PPVE | 0.46 | — | — |
| Synthesis Example 21 | 85 | 0.83 | APS | 0.006 | APFH | 55.0 | CTFE | 0.18 | — | — |
| Synthesis Example 22 | 85 | 0.20 | APS | 0.006 | APFH | 55.0 | PMVE | 0.01 | — | — |
| Synthesis Example 23 | 70 | 0.83 | APS | 0.110 | PMPA | 27.5 | CNVE | 1.12 | Ethane | 0.03 |
| Synthesis Example 24 | 85 | 0.83 | APS | 0.110 | APFH | 55.0 | PPVE | 8.80 | Ethane | 0.03 |
| Synthesis Example 25 | 85 | 0.83 | APS | 0.110 | APFH | 55.0 | PPVE | 5.90 | Ethane | 0.02 |
| Synthesis Example 26 | 85 | 0.83 | APS | 0.006 | PMPA | 8.3 | — | — | Ethane | 0.03 |

TABLE 2

| | Volume average particle size nm | Number of particles (×$10^{15}$) particles | MV (×$10^3$) Pa·S | MFR g/10 min | Modified amount Type | Modified amount Mol % | Melting point °C. | Solids content Mass % | Dispersion stability* Storage stability (Sediment amount) Mass % | Dispersion stability* Mechanical stability (Mesh-up amount) Mass % |
|---|---|---|---|---|---|---|---|---|---|---|
| Synthesis Example 1 | 0.9 | 296446 | 3.0 | Not measured | — | — | 327.0 | 20.5 | 0.1 | 0.1 |
| Synthesis Example 2 | 2.3 | 18421 | 8.0 | Not measured | — | — | 328.4 | 21.1 | 0.1 | 0.2 |
| Synthesis Example 3 | 5.3 | 1533 | Unmeasurable | Not measured | — | — | 331.1 | 21.4 | 1.2 | 0.5 |
| Synthesis Example 4 | 4.2 | 2317 | Unmeasurable | Not measured | — | — | 331.2 | 17.0 | 2.3 | 0.8 |
| Synthesis Example 5 | 1.2 | 132049 | 15.8 | Not measured | — | — | 329.3 | 21.4 | 0.2 | 0.2 |
| Synthesis Example 6 | 5.7 | 1508 | Unmeasurable | Not measured | — | — | 330.8 | 25.0 | 2.4 | 0.8 |
| Synthesis Example 7 | 4.8 | 115 | Unmeasurable | Not measured | — | — | 328.8 | 1.5 | 0.1 | 0.1 |
| Synthesis Example 8 | 2.3 | 4789 | Unmeasurable | Not measured | — | — | 329.3 | 6.5 | 0.2 | 0.2 |
| Synthesis Example 9 | 4.7 | 655 | Unmeasurable | Not measured | — | — | 328.5 | 7.5 | 0.2 | 0.7 |
| Synthesis Example 10 | 6.5 | 233 | Unmeasurable | Not measured | — | — | 329.0 | 7.1 | 2.1 | 1.0 |
| Synthesis Example 11 | 12.1 | 36 | Unmeasurable | Not measured | — | — | 328.2 | 7.1 | 5.1 | 1.7 |
| Synthesis Example 12 | 19.5 | 9 | Unmeasurable | Not measured | — | — | 328.8 | 7.1 | 7.8 | 2.2 |
| Synthesis Example 13 | 3.1 | 6902 | Unmeasurable | Not measured | — | — | 331.1 | 19.7 | 0.3 | 0.5 |
| Synthesis Example 14 | 1.3 | 94771 | Unmeasurable | Not measured | CNVE | 0.20 | 327.0 | 19.9 | 0.1 | 0.1 |
| Synthesis Example 15 | 11.8 | 135 | Unmeasurable | Not measured | CNVE | 0.18 | 329.4 | 20.9 | 0.2 | 0.3 |
| Synthesis Example 16 | 1.6 | 50515 | Unmeasurable | Not measured | CNVE | 0.24 | 331.4 | 19.8 | 0.1 | 0.2 |
| Synthesis Example 17 | 1.9 | 29598 | Unmeasurable | Not measured | PFHE | 0.07 | 329.0 | 19.5 | 0.1 | 0.2 |
| Synthesis Example 18 | 7.6 | 486 | Unmeasurable | Not measured | HFP | 0.10 | 334.9 | 20.3 | 2.7 | 1.2 |

TABLE 2-continued

|  | Volume average particle size nm | Number of particles (×10¹⁵) particles | MV (×10³) Pa·S | MFR g/10 min | Modified amount Type | Modified amount Amount Mol % | Melting point °C | Solids content Mass % | Dispersion stability* Storage stability (Sediment amount) Mass % | Dispersion stability* Mechanical stability (Mesh-up amount) Mass % |
|---|---|---|---|---|---|---|---|---|---|---|
| Synthesis Example 19 | 1.4 | 21582 | Unmeasurable | Not measured | PMVE | 0.20 | 334.7 | 6.6 | 0.1 | 0.2 |
| Synthesis Example 20 | 1.2 | 34272 | Unmeasurable | Not measured | PPVE | 0.26 | 326.1 | 6.6 | 0.1 | 0.2 |
| Synthesis Example 21 | 7.1 | 165 | Unmeasurable | Not measured | CTFE | 0.27 | 332.8 | 6.6 | 2.5 | 1.1 |
| Synthesis Example 22 | 3.5 | 1337 | Unmeasurable | Not measured | PMVE | 0.02 | 331.6 | 6.4 | 0.3 | 0.5 |
| Synthesis Example 23 | 0.8 | 440379 | Unmeasurable | Not measured | CNVE | 0.60 | 329.6 | 21.2 | 0.1 | 0.2 |
| Synthesis Example 24 | 6.0 | 881 | Not measured | 230 | PPVE | 1.49 | 319.7 | 18.5 | 2.0 | 0.7 |
| Synthesis Example 25 | 6.1 | 849 | Not measured | 87 | PPVE | 1.21 | 313.6 | 18.7 | 2.2 | 0.8 |
| Synthesis Example 26 | 121.6 | 0.036 | Unmeasurable | Not measured | — | — | 327.6 | 7.1 | 22.9 | 5.3 |

*In Example 7, performed at solids content 1.0 mass %

(2) 2nd Stage

Example 1

A 1-L glass reactor equipped with a stirrer was charged with 528.4 g of deionized water, 30 g of paraffin wax, 2.0 g of the PTFE aqueous dispersion produced in Synthesis Example 1, and 0.63 g of ammonium perfluorohexanoate (APFH) dispersant. Next, the contents of the reactor were heated up to 70° C. and sucked, then simultaneously the reactor was purged with a TFE monomer, thereby removing the oxygen in the reactor. Thereafter, the contents were stirred at 540 rpm. The TFE monomer was added to the reactor until the inner pressure reached 0.73 MPaG. An initiator prepared by dissolving 0.003 g of ammonium persulfate in 20 g of deionized water was charged into the reactor, and the pressure in the reactor was adjusted to 0.83 MPaG. The charging of the initiator was followed by a decrease in the pressure, which means that the start of the polymerization was observed. The TFE monomer was added to the reactor to keep the pressure, and the polymerization was continued until about 90 g of the TFE monomer was consumed in the reaction. Thereafter, the air in the reactor was discharged, and the contents were then taken out of the reactor and cooled down. The amount of the polymer stuck to the agitator after the polymerization was 0.49 g. Supernatant paraffin wax was removed from the resulting PTFE aqueous dispersion.

The whole amount of the ammonium perfluorohexanoate dispersant added was 0.77 g in the aqueous medium.

The resulting PTFE aqueous dispersion had a solids content of 13.9% by mass and an average primary particle size of 228 nm.

The PTFE aqueous dispersion was diluted with deionized water to a solids content of about 10% by weight, and then coagulated by rapid stirring. The coagulated powder was dried at 150° C. for 18 hours. The PTFE powder at this time had an SSG of 2.170 and a melting point of 344.2° C.

Then, 100 g of the resulting PTFE aqueous dispersion was uniformly mixed with 2.0 g of a surfactant (NOIGEN TDS-80, DKS Co., Ltd.), and the mixture was passed through a column filled with an anion exchange resin (trade name: AMBERLITE IRA900J, Rohm and Haas). The resulting aqueous dispersion was maintained at 60° C., and the condensed phase provided by phase separation was collected. This condensed phase had a solids content of 65% by mass. Water and a surfactant were further added to the condensed phase to give a solids content of 60% by mass and a surfactant content of 8% by mass, and the pH was adjusted to 9.8 with ammonia water.

Example 2

The polymerization was performed in the same manner as in Example 1 except that the amount of the deionized water was not 528.4 g as in Example 1 but 528.3 g, 2.0 g of the PTFE aqueous dispersion produced in Synthesis Example 1 was replaced by 2.1 g of the PTFE aqueous dispersion produced in Synthesis Example 2, and the amount of the ammonium perfluorohexanoate dispersant was not 0.63 g but 0.68 g. The whole amount of the ammonium perfluorohexanoate dispersant added was 0.83 g in the aqueous medium.

Example 3

The polymerization was performed in the same manner as in Example 1 except that the amount of the deionized water was not 528.4 g as in Example 1 but 526.1 g, 2.0 g of the PTFE aqueous dispersion produced in Synthesis Example 1 was replaced by 5.0 g of the PTFE aqueous dispersion produced in Synthesis Example 2, and the amount of the ammonium perfluorohexanoate dispersant was not 0.63 g but 0.46 g. The whole amount of the ammonium perfluorohexanoate dispersant added was 0.83 g in the aqueous medium.

Example 4

The polymerization was performed in the same manner as in Example 1 except that the amount of the deionized water was not 528.4 g as in Example 1 but 522.1 g, 2.0 g of the PTFE aqueous dispersion produced in Synthesis Example 1 was replaced by 10.0 g of the PTFE aqueous dispersion produced in Synthesis Example 2, and the amount of the ammonium perfluorohexanoate dispersant was not 0.63 g but 0.09 g. The whole amount of the ammonium perfluorohexanoate dispersant added was 0.83 g in the aqueous medium.

Example 5

The polymerization was performed in the same manner as in Example 1 except that the amount of the deionized water was not 528.4 g as in Example 1 but 526.1 g, 2.0 g of the PTFE aqueous dispersion produced in Synthesis Example 1 was replaced by 5.0 g of the PTFE aqueous dispersion produced in Synthesis Example 2, and 0.63 g of the ammonium perfluorohexanoate dispersant was not added. The whole amount of the ammonium perfluorohexanoate dispersant was 0.37 g in the aqueous medium.

Example 6

The polymerization was performed in the same manner as in Example 1 except that the amount of the deionized water was not 528.4 g as in Example 1 but 526.1 g, 2.0 g of the PTFE aqueous dispersion produced in Synthesis Example 1 was replaced by 5.0 g of the PTFE aqueous dispersion produced in Synthesis Example 3, and the amount of the ammonium perfluorohexanoate dispersant was not 0.63 g but 0.46 g. The whole amount of the ammonium perfluorohexanoate dispersant added was 0.83 g in the aqueous medium.

Example 7

The polymerization was performed in the same manner as in Example 1 except that the amount of the deionized water was not 528.4 g as in Example 1 but 526.1 g, 2.0 g of the PTFE aqueous dispersion produced in Synthesis Example 1 was replaced by 5.0 g of the PTFE aqueous dispersion produced in Synthesis Example 3, the amount of the ammonium perfluorohexanoate dispersant was not 0.63 g but 1.29 g, and the polymerization was continued until about 230 g of the TFE monomer was consumed in the reaction. The whole amount of the ammonium perfluorohexanoate dispersant added was 1.65 g in the aqueous medium.

Example 8

The polymerization was performed in the same manner as in Example 1 except that the amount of the deionized water was not 528.4 g as in Example 1 but 526.3 g, 2.0 g of the PTFE aqueous dispersion produced in Synthesis Example 1 was replaced by 4.9 g of the PTFE aqueous dispersion produced in Synthesis Example 6, and the amount of the ammonium perfluorohexanoate dispersant was not 0.63 g but 0.49 g. The whole amount of the ammonium perfluorohexanoate dispersant added was 0.83 g in the aqueous medium.

Example 9

The polymerization was performed in the same manner as in Example 1 except that the amount of the deionized water was not 528.4 g as in Example 1 but 485.7 g, 2.0 g of the PTFE aqueous dispersion produced in Synthesis Example 1 was replaced by 45.0 g of the PTFE aqueous dispersion produced in Synthesis Example 7, and 0.63 g of the ammonium perfluorohexanoate dispersant was not added. The whole amount of the ammonium perfluorohexanoate dispersant was 2.03 g in the aqueous medium.

Example 10

The polymerization was performed in the same manner as in Example 1 except that the amount of the deionized water was not 528.4 g as in Example 1 but 520.9 g, 2.0 g of the PTFE aqueous dispersion produced in Synthesis Example 1 was replaced by 9.7 g of the PTFE aqueous dispersion produced in Synthesis Example 8, and 0.63 g of the ammonium perfluorohexanoate dispersant was not added. The whole amount of the ammonium perfluorohexanoate dispersant was 0.83 g in the aqueous medium.

Example 11

The polymerization was performed in the same manner as in Example 1 except that the amount of the deionized water was not 528.4 g as in Example 1 but 515.8 g, 2.0 g of the PTFE aqueous dispersion produced in Synthesis Example 1 was replaced by 15.4 g of the PTFE aqueous dispersion produced in Synthesis Example 9, and 0.63 g of the ammonium perfluorohexanoate dispersant was replaced by 0.28 g of PMPA. The whole amount of the PMPA added was 0.83 g in the aqueous medium.

Example 12

The polymerization was performed in the same manner as in Example 1 except that the amount of the deionized water was not 528.4 g as in Example 1 but 514.2 g, 2.0 g of the PTFE aqueous dispersion produced in Synthesis Example 1 was replaced by 17.0 g of the PTFE aqueous dispersion produced in Synthesis Example 10, and 0.63 g of the ammonium perfluorohexanoate dispersant was replaced by 0.37 g of PMPA. The whole amount of the PMPA added was 0.83 g in the aqueous medium.

Example 13

The polymerization was performed in the same manner as in Example 1 except that the amount of the deionized water was not 528.4 g as in Example 1 but 492.8 g, 2.0 g of the PTFE aqueous dispersion produced in Synthesis Example 1 was replaced by 40.0 g of the PTFE aqueous dispersion produced in Synthesis Example 11, and 0.63 g of the ammonium perfluorohexanoate dispersant was replaced by 0.10 g of PMPA. The whole amount of the PMPA added was 0.83 g in the aqueous medium.

Example 14

The polymerization was performed in the same manner as in Example 1 except that the amount of the deionized water was not 528.4 g as in Example 1 but 483.4 g, 2.0 g of the PTFE aqueous dispersion produced in Synthesis Example 1 was replaced by 50.2 g of the PTFE aqueous dispersion produced in Synthesis Example 12, and 0.63 g of the ammonium perfluorohexanoate dispersant was not added. The whole amount of the PMPA in the aqueous medium was 0.83 g.

Example 15

The polymerization was performed in the same manner as in Example 1 except that the amount of the deionized water was not 528.4 g as in Example 1 but 525.2 g, 2.0 g of the PTFE aqueous dispersion produced in Synthesis Example 1 was replaced by 6.0 g of the PTFE aqueous dispersion produced in Synthesis Example 13, and 0.63 g of the ammonium perfluorohexanoate dispersant was not added. The whole amount of the APFH in the aqueous medium was 2.48 g.

Example 16

The polymerization was performed in the same manner as in Example 1 except that 2.0 g of the PTFE aqueous dispersion produced in Synthesis Example 1 as used in Example 1 was replaced by 2.0 g of the PTFE aqueous dispersion produced in Synthesis Example 14 and the amount of the ammonium perfluorohexanoate dispersant was not 0.63 g but 0.68 g. The whole amount of the ammonium perfluorohexanoate dispersant added was 0.83 g in the aqueous medium.

Example 17

The polymerization was performed in the same manner as in Example 1 except that the amount of the deionized water was not 528.4 g as in Example 1 but 529.2 g, 2.0 g of the PTFE aqueous dispersion produced in Synthesis Example 1 was replaced by 1.0 g of the PTFE aqueous dispersion produced in Synthesis Example 9, and the amount of the ammonium perfluorohexanoate dispersant was not 0.63 g but 2.38 g. The whole amount of the ammonium perfluorohexanoate dispersant added was 2.48 g in the aqueous medium.

Example 18

The polymerization was performed in the same manner as in Example 1 except that 2.0 g of the PTFE aqueous dispersion produced in Synthesis Example 1 as used in Example 1 was replaced by 2.0 g of the PTFE aqueous dispersion produced in Synthesis Example 9. The whole amount of the ammonium perfluorohexanoate dispersant added was 0.83 g in the aqueous medium.

Example 19

The polymerization was performed in the same manner as in Example 1 except that 2.0 g of the PTFE aqueous dispersion produced in Synthesis Example 1 as used in Example 1 was replaced by 2.0 g of the PTFE aqueous dispersion produced in Synthesis Example 9 and 0.63 g of the ammonium perfluorohexanoate dispersant was not added. The whole amount of the ammonium perfluorohexanoate dispersant was 0.20 g in the aqueous medium.

Example 20

The polymerization was performed in the same manner as in Example 1 except that the amount of the deionized water was not 528.4 g as in Example 1 but 529.2 g, 2.0 g of the PTFE aqueous dispersion produced in Synthesis Example 1 was replaced by 1.0 g of the PTFE aqueous dispersion produced in Synthesis Example 9, and 0.63 g of the ammonium perfluorohexanoate dispersant was not added. The whole amount of the ammonium perfluorohexanoate dispersant was 0.10 g in the aqueous medium.

Example 21

The polymerization was performed in the same manner as in Example 1 except that the amount of the deionized water was not 528.4 g as in Example 1 but 523.6 g, 2.0 g of the PTFE aqueous dispersion produced in Synthesis Example 1 was replaced by 8.0 g of the PTFE aqueous dispersion produced in Synthesis Example 17, and the amount of the ammonium perfluorohexanoate dispersant was not 0.63 g but 0.23 g. The whole amount of the ammonium perfluorohexanoate dispersant added was 0.83 g in the aqueous medium.

Example 22

The polymerization was performed in the same manner as in Example 1 except that the amount of the deionized water was not 528.4 g as in Example 1 but 523.6 g, 2.0 g of the PTFE aqueous dispersion produced in Synthesis Example 1 was replaced by 8.0 g of the PTFE aqueous dispersion produced in Synthesis Example 18, and the amount of the ammonium perfluorohexanoate dispersant was not 0.63 g but 0.23 g. The whole amount of the ammonium perfluorohexanoate dispersant added was 0.83 g in the aqueous medium.

Example 23

The polymerization was performed in the same manner as in Example 1 except that the amount of the deionized water was not 528.4 g as in Example 1 but 522.5 g, 2.0 g of the PTFE aqueous dispersion produced in Synthesis Example 1 was replaced by 8.0 g of the PTFE aqueous dispersion produced in Synthesis Example 19, and the amount of the ammonium perfluorohexanoate dispersant was not 0.63 g but 0.15 g. The whole amount of the ammonium perfluorohexanoate dispersant added was 0.83 g in the aqueous medium.

Example 24

The polymerization was performed in the same manner as in Example 1 except that the amount of the deionized water was not 528.4 g as in Example 1 but 522.5 g, 2.0 g of the PTFE aqueous dispersion produced in Synthesis Example 1 was replaced by 8.0 g of the PTFE aqueous dispersion produced in Synthesis Example 20, and the amount of the ammonium perfluorohexanoate dispersant was not 0.63 g but 0.15 g. The whole amount of the ammonium perfluorohexanoate dispersant added was 0.83 g in the aqueous medium.

Example 25

The polymerization was performed in the same manner as in Example 1 except that the amount of the deionized water was not 528.4 g as in Example 1 but 522.5 g, 2.0 g of the PTFE aqueous dispersion produced in Synthesis Example 1 was replaced by 8.0 g of the PTFE aqueous dispersion produced in Synthesis Example 21, and the amount of the ammonium perfluorohexanoate dispersant was not 0.63 g but 0.14 g. The whole amount of the ammonium perfluorohexanoate dispersant added was 0.83 g in the aqueous medium.

Example 26

The polymerization was performed in the same manner as in Example 1 except that the amount of the deionized water was not 528.4 g as in Example 1 but 521.2 g, 2.0 g of the PTFE aqueous dispersion produced in Synthesis Example 1 was replaced by 9.4 g of the PTFE aqueous dispersion produced in Synthesis Example 22, and the amount of the ammonium perfluorohexanoate dispersant was not 0.63 g but 0.03 g. The whole amount of the ammonium perfluorohexanoate dispersant added was 0.83 g in the aqueous medium.

Example 27

The polymerization was performed in the same manner as in Example 1 except that the amount of the deionized water was not 528.4 g as in Example 1 but 520.8 g, 2.0 g of the PTFE aqueous dispersion produced in Synthesis Example 1 was replaced by 11.3 g of the PTFE aqueous dispersion produced in Synthesis Example 24, and 0.63 g of the ammonium perfluorohexanoate dispersant was not added. The whole amount of the ammonium perfluorohexanoate dispersant was 0.83 g in the aqueous medium.

Example 28

A 1-L glass reactor equipped with a stirrer was charged with 528.4 g of deionized water, 30 g of paraffin wax, 2.0 g of the PTFE aqueous dispersion produced in Synthesis Example 1, and 0.63 g of ammonium perfluorohexanoate (APFH) dispersant. Next, the contents of the reactor were heated up to 70° C. and sucked, then simultaneously the reactor was purged with a TFE monomer, thereby removing the oxygen in the reactor. Thereafter, 0.30 g of PPVE was added to the reactor, and the contents were stirred at 540 rpm. The TFE monomer was added to the reactor until the inner pressure reached 0.73 MPaG. An initiator prepared by dissolving 0.003 g of ammonium persulfate (APS) in 20 g of deionized water was charged into the reactor, and the pressure in the reactor was adjusted to 0.83 MPaG. The charging of the initiator was followed by a decrease in the pressure, which means that the start of the polymerization was observed. The TFE monomer was added to the reactor to keep the pressure, and the polymerization was continued until about 90 g of the TFE monomer was consumed in the reaction. Thereafter, the air in the reactor was discharged, and the contents were then taken out of the reactor and cooled down. The amount of the polymer stuck to the agitator after the polymerization was 0.37 g. Supernatant paraffin wax was removed from the resulting PTFE aqueous dispersion.

The whole amount of the ammonium perfluorohexanoate dispersant added was 0.77 g in the aqueous medium.

The resulting PTFE aqueous dispersion had a solids content of 14.0% by mass and an average primary particle size of 220 nm.

The PTFE aqueous dispersion was diluted with deionized water to a solids content of about 10% by weight, and then coagulated by rapid stirring. The coagulated powder was dried at 150° C. for 18 hours. The PTFE powder at this time had an SSG of 2.173, a melting point of 343.9° C., and a PPVE modifying amount of 0.08 mol %.

Example 29

The polymerization was performed in the same manner as in Example 28 except that 0.30 g of the PPVE as in Example 28 was replaced by 0.20 g of CTFE. The PTFE powder at this time had an SSG of 2.171, a melting point of 343.8° C., and a CTFE modifying amount of 0.16 mol %. The whole amount of the ammonium perfluorohexanoate dispersant added was 0.77 g in the aqueous medium.

Comparative Example 1

The polymerization was performed in the same manner as in Example 1 except that the amount of the deionized water was not 528.4 g as in Example 1 but 482.3 g, 2.0 g of the PTFE aqueous dispersion produced in Synthesis Example 1 was replaced by 51.3 g of the PTFE aqueous dispersion produced in Synthesis Example 25, and the amount of the ammonium perfluorohexanoate dispersant was not 0.63 g but 0.12 g. The whole amount of the ammonium perfluorohexanoate dispersant added was 0.83 g in the aqueous medium.

The charging of the initiator was followed by a decrease in the pressure, which means that the start of the polymerization was observed. After a while, some substance stuck to the agitator, and after another while, abrupt polymer coagulation was observed. Finally, the polymerization was terminated before about 90 g of the TFE monomer was consumed in the reaction.

Tables 3 and 4 show the polymerization conditions and the evaluation results on the PTFE aqueous dispersions in the respective examples.

TABLE 3

| | Fluoropolymer aqueous dispersion | | Numer of particles ($\times 10^{15}$) | Emulsifying agent | | Modifying agent | |
|---|---|---|---|---|---|---|---|
| | Type | Amount g | | Type | Amount g | Type | Amount g |
| Example 1 | Synthesis Example 1 | 2.0 | 1080 | APFH | 0.77 | — | — |
| Example 2 | Synthesis Example 2 | 2.1 | 70 | APFH | 0.83 | — | — |
| Example 3 | Synthesis Example 2 | 5.0 | 168 | APFH | 0.83 | — | — |
| Example 4 | Synthesis Example 2 | 10.0 | 335 | APFH | 0.83 | — | — |
| Example 5 | Synthesis Example 2 | 5.0 | 168 | APFH | 0.37 | — | — |
| Example 6 | Synthesis Example 3 | 5.0 | 14 | APFH | 0.83 | — | — |
| Example 7 | Synthesis Example 3 | 5.0 | 14 | APFH | 1.65 | — | — |
| Example 8 | Synthesis Example 6 | 4.9 | 13 | APFH | 0.83 | — | — |
| Example 9 | Synthesis Example 7 | 45.0 | 9 | APFH | 2.03 | — | — |
| Example 10 | Synthesis Example 8 | 9.7 | 83 | APFH | 0.83 | — | — |
| Example 11 | Synthesis Example 9 | 15.4 | 18 | PMPA | 0.83 | — | — |
| Example 12 | Synthesis Example 10 | 17.0 | 7 | PMPA | 0.83 | — | — |
| Example 13 | Synthesis Example 11 | 40.0 | 3 | PMPA | 0.83 | — | — |
| Example 14 | Synthesis Example 12 | 50.2 | 0.8 | PMPA | 0.83 | — | — |
| Example 15 | Synthesis Example 13 | 6.0 | 75 | APFP | 2.48 | — | — |
| Example 16 | Synthesis Example 14 | 2.0 | 346 | APFH | 0.83 | — | — |
| Example 17 | Synthesis Example 16 | 1.0 | 92 | APFH | 2.48 | — | — |
| Example 18 | Synthesis Example 16 | 2.0 | 184 | APFH | 0.83 | — | — |
| Example 19 | Synthesis Example 16 | 2.0 | 184 | APFH | 0.20 | — | — |
| Example 20 | Synthesis Example 16 | 1.0 | 92 | APFH | 0.10 | — | — |
| Example 21 | Synthesis Example 17 | 8.0 | 430 | APFH | 0.83 | — | — |
| Example 22 | Synthesis Example 18 | 8.0 | 7 | APFH | 0.83 | — | — |
| Example 23 | Synthesis Example 19 | 8.0 | 313 | APFH | 0.83 | — | — |
| Example 24 | Synthesis Example 20 | 8.0 | 500 | APFH | 0.83 | — | — |
| Example 25 | Synthesis Example 21 | 8.0 | 2 | APFH | 0.83 | — | — |
| Example 26 | Synthesis Example 22 | 9.4 | 23 | APFH | 0.83 | — | — |
| Example 27 | Synthesis Example 24 | 11.3 | 21 | APFH | 0.83 | — | — |
| Example 28 | Synthesis Example 1 | 2.0 | 1080 | APFH | 0.77 | PPVE | 0.30 |
| Example 29 | Synthesis Example 1 | 2.0 | 1080 | APFH | 0.77 | CTFE | 0.20 |
| Comparative Example 1 | Synthesis Example 26 | 51.3 | 0.003 | PMPA | 0.83 | — | — |

TABLE 4

| | Average primary particle size nm | SSG | Melting point °C. | Reaction time Hours | Solids content Mass % | Stuck amount to impeller g | Modified amount Type | Modified amount Amount Mol % |
|---|---|---|---|---|---|---|---|---|
| Example 1 | 228 | 2.170 | 344.2 | 2.6 | 13.9 | 0.49 | — | — |
| Example 2 | 223 | 2.177 | 344.0 | 2.3 | 13.8 | 0.55 | — | — |
| Example 3 | 200 | 2.187 | 343.9 | 2.5 | 13.9 | 0.34 | — | — |
| Example 4 | 190 | 2.198 | 343.6 | 2.5 | 14.2 | 0.40 | — | — |
| Example 5 | 197 | 2.188 | 343.6 | 2.3 | 14.1 | 0.59 | — | — |
| Example 6 | 219 | 2.180 | 343.9 | 2.2 | 14.0 | 0.50 | — | — |
| Example 7 | 296 | 2.162 | 344.2 | 6.9 | 29.1 | 1.05 | — | — |
| Example 8 | 224 | 2.181 | 343.9 | 2.5 | 14.4 | 0.96 | — | — |
| Example 9 | 251 | 2.179 | 343.8 | 2.4 | 14.0 | 0.82 | — | — |
| Example 10 | 206 | 2.179 | 343.9 | 2.4 | 13.9 | 0.28 | — | — |
| Example 11 | 221 | 2.178 | 344.3 | 2.2 | 14.1 | 0.26 | — | — |
| Example 12 | 239 | 2.175 | 343.9 | 2.5 | 13.9 | 0.34 | — | — |
| Example 13 | 282 | 2.178 | 343.5 | 2.7 | 13.8 | 0.41 | — | — |
| Example 14 | 346 | 2.179 | 343.4 | 3.3 | 13.5 | 1.30 | — | — |
| Example 15 | 211 | 2.179 | 343.8 | 2.7 | 13.8 | 1.04 | — | — |
| Example 16 | 228 | 2.170 | 344.0 | 2.2 | 13.7 | 0.54 | — | — |
| Example 17 | 228 | 2.174 | 344.5 | 2.5 | 13.7 | 0.40 | — | — |
| Example 18 | 202 | 2.179 | 344.1 | 2.5 | 13.9 | 0.25 | — | — |
| Example 19 | 202 | 2.178 | 343.8 | 2.6 | 13.9 | 0.35 | — | — |
| Example 20 | 223 | 2.177 | 343.9 | 2.9 | 13.9 | 0.55 | — | — |
| Example 21 | 212 | 2.172 | 343.7 | 3.3 | 14.4 | 0.39 | PFHE | ND |
| Example 22 | 248 | 2.176 | 343.9 | 2.3 | 14.1 | 0.47 | HFP | Trace |
| Example 23 | 228 | 2.174 | 343.8 | 2.4 | 14.0 | 0.28 | PMVE | ND |
| Example 24 | 204 | 2.174 | 343.6 | 2.6 | 14.2 | 0.29 | PPVE | Trace |
| Example 25 | 218 | 2.188 | 343.6 | 2.6 | 14.0 | 0.54 | CTFE | Trace |
| Example 26 | 223 | 2.176 | 343.8 | 2.5 | 14.2 | 0.38 | PMVE | ND |
| Example 27 | 223 | 2.177 | 343.9 | 2.9 | 13.9 | 0.55 | PPVE | 0.05 |
| Example 28 | 220 | 2.173 | 343.9 | 2.6 | 14.0 | 0.37 | PPVE | 0.08 |
| Example 29 | 224 | 2.171 | 343.8 | 2.7 | 13.9 | 0.45 | CTFE | 0.16 |
| Comparative Example 1 | Not measured | Not measured | Not measured | 1.2 | Not measured | Much | — | — |

(Note 1) The amount of the emulsifying agent in the 2nd stage included the amount of the emulsifying agent used in the 1st stage (the emulsifying agent in the PTFE aqueous dispersion produced in the 1st stage).

(Note 2) The amount of the substance stuck to the agitator included the amounts of PTFE, paraffin wax stuck to the PTFE, and water.

INDUSTRIAL APPLICABILITY

The method of producing a polytetrafluoroethylene aqueous dispersion of the present invention can provide an aqueous dispersion which contains polytetrafluoroethylene particles having a significantly small particle size and which is excellent in dispersion stability by multistage polymerization without a long-chain fluorosurfactant.

The invention claimed is:

1. A method of producing a polytetrafluoroethylene aqueous dispersion, comprising the steps of:
   (1) polymerizing a fluoromonomer in an aqueous medium in the presence of a fluorosurfactant and a polymerization initiator to provide an aqueous dispersion containing particles of at least one fluoropolymer selected from the group consisting of polytetrafluoroethylene and melt-processible fluororesins excluding polytetrafluoroethylene; and
   (2) polymerizing tetrafluoroethylene alone or tetrafluoroethylene and a modifying monomer in an aqueous medium in the presence of the fluoropolymer particles and a polymerization initiator to provide an aqueous dispersion containing polytetrafluoroethylene particles, the fluoropolymer particles having an equivalent weight (EW) of not less than 6,000 and a volume average particle size of not smaller than 0.1 nm but smaller than 20 nm.

2. The method of producing a polytetrafluoroethylene aqueous dispersion according to claim 1,
   wherein the fluorosurfactant is a fluorinated compound represented by the following formula (1):

$$X-(CF_2)_{m1}-Y \quad (1)$$

wherein X represents H or F; m1 is an integer of 3 to 5; and Y represents $-SO_3M$, $-SO_4M$, $-SO_3R$, $-SO_4R$, $-COOM$, $-PO_3M_2$, or $-PO_4M_2$, where M represents H, $NH_4$, or an alkali metal, and R represents a C1-C12 alkyl group.

3. The method of producing a polytetrafluoroethylene aqueous dispersion according to claim 1,
   wherein the polymerization reactions in the steps (1) and (2) are performed in the absence of a fluorinated compound represented by the following formula (2):

$$X-(CF_2)_{m2}-Y \quad (2)$$

wherein X represents H or F; m2 is an integer of 6 or greater; and Y represents $-SO_3M$, $-SO_4M$, $-SO_3R$, $-SO_4R$, $-COOM$, $-PO_3M_2$, or $-PO_4M_2$, where M represents H, $NH_4$, or an alkali metal, and R represents a C1-C12 alkyl group.

4. The method of producing a polytetrafluoroethylene aqueous dispersion according to claim 1,
   wherein the fluorosurfactant has a Log POW value of not higher than 3.4.

5. The method of producing a polytetrafluoroethylene aqueous dispersion according to claim 1,
   wherein the polytetrafluoroethylene particles have an average primary particle size of 100 to 500 nm.

* * * * *